(12) United States Patent
Barton

(10) Patent No.: US 12,496,053 B2
(45) Date of Patent: Dec. 16, 2025

(54) RETRACTOR

(71) Applicant: Esabelle Barton, Northridge, CA (US)

(72) Inventor: Esabelle Barton, Northridge, CA (US)

( * ) Notice: Subject to any disclaimer, the term of this patent is extended or adjusted under 35 U.S.C. 154(b) by 487 days.

(21) Appl. No.: 17/818,490

(22) Filed: Aug. 9, 2022

(65) Prior Publication Data

US 2023/0081235 A1   Mar. 16, 2023

Related U.S. Application Data

(63) Continuation-in-part of application No. 29/807,701, filed on Sep. 14, 2021, now Pat. No. Des. 1,009,253.

(51) Int. Cl.
    *A61B 17/02* (2006.01)
    *A61B 17/00* (2006.01)

(52) U.S. Cl.
    CPC ............ *A61B 17/0218* (2013.01); *A61B 2017/00424* (2013.01); *A61B 2017/00907* (2013.01); *A61B 2217/005* (2013.01)

(58) Field of Classification Search
    CPC ...... A61B 17/0218; A61B 2017/00907; A61B 2217/005; A61B 17/02
    USPC ................................................. 600/201–245
    See application file for complete search history.

(56) References Cited

U.S. PATENT DOCUMENTS

| | | | | |
|---|---|---|---|---|
| 4,049,000 A | * | 9/1977 | Williams | A61M 1/7411 |
| | | | | 433/95 |
| 2005/0107671 A1 | * | 5/2005 | McKinley | A61B 17/025 |
| | | | | 600/235 |
| 2013/0035555 A1 | * | 2/2013 | Alexander | A61B 17/0218 |
| | | | | 600/207 |
| 2014/0257039 A1 | | 9/2014 | Feldman | |

OTHER PUBLICATIONS

Stryker: "Eikon LT Adapt SE," in 2 pages, Copyright 2019, downloaded at https://www.stryker.com/us/en/surgical-technologies/products/eikon-lt-adapt-se.html on Dec. 13, 2021.

Stryker: "Illuminated Instruments for plastic and reconstructive surgery," in 6 pages, Copyright 2019, downloaded at https://www.stryker.com/us/en/surgical-technologies/products/eikon-lt-adapt-se.html on Dec. 13, 2021.

* cited by examiner

*Primary Examiner* — Eduardo C Robert
*Assistant Examiner* — Tara Rose E Carter
(74) *Attorney, Agent, or Firm* — Knobbe, Martens, Olson & Bear, LLP

(57) ABSTRACT

A retractor for retracting tissue and suctioning fluids, having a handle and a blade and a fluid passage therethrough connecting to a suction source, the fluid passage directing suction to perforations in the blade through which undesirable fluids, including surgical plume, may be evacuated. The retractor may be, in whole or part, transparent to observe suctioning. The blade may include a fanned tip for wide tissue-engagement. One or more perforations in the fanned tip may create a wide field of suction. Other perforations in the blade may present suction at differing elevations with respect to the surgical field. The handle may include one or more thumb/finger depressions for improved grip and maneuverability. The handle may include knurling ridges to reduce slippage. When not in use for retraction, the retractor may be clipped to another retractor where it may still suction fluids without being held.

37 Claims, 13 Drawing Sheets

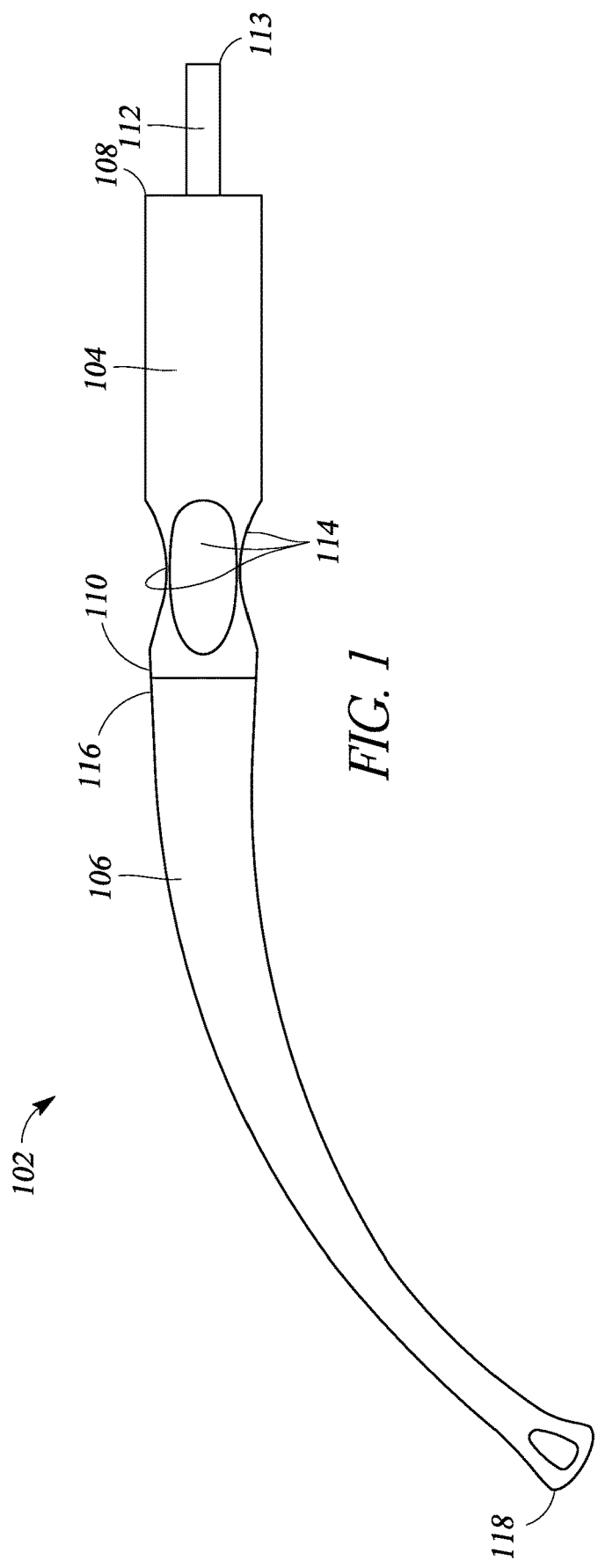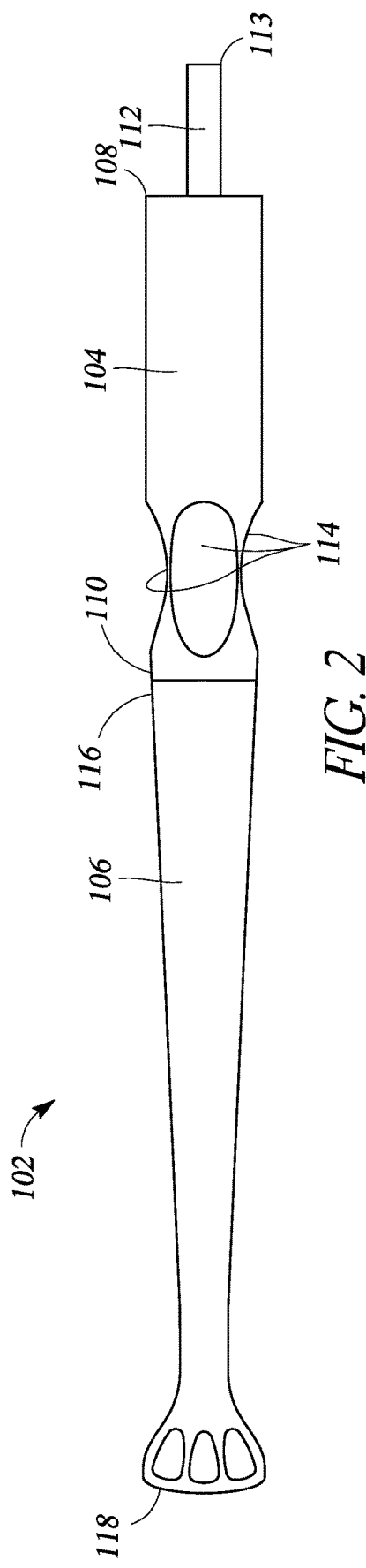

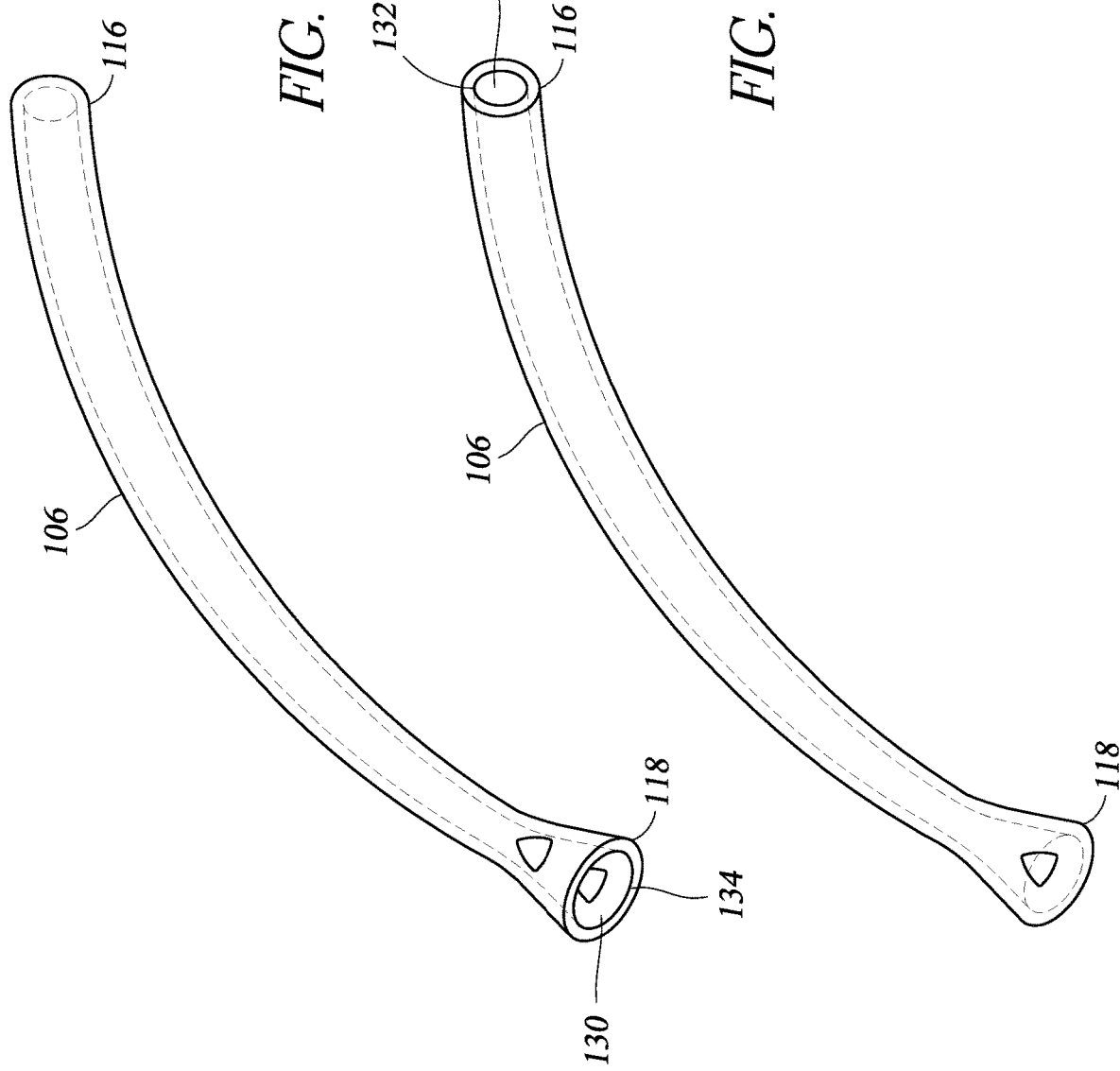

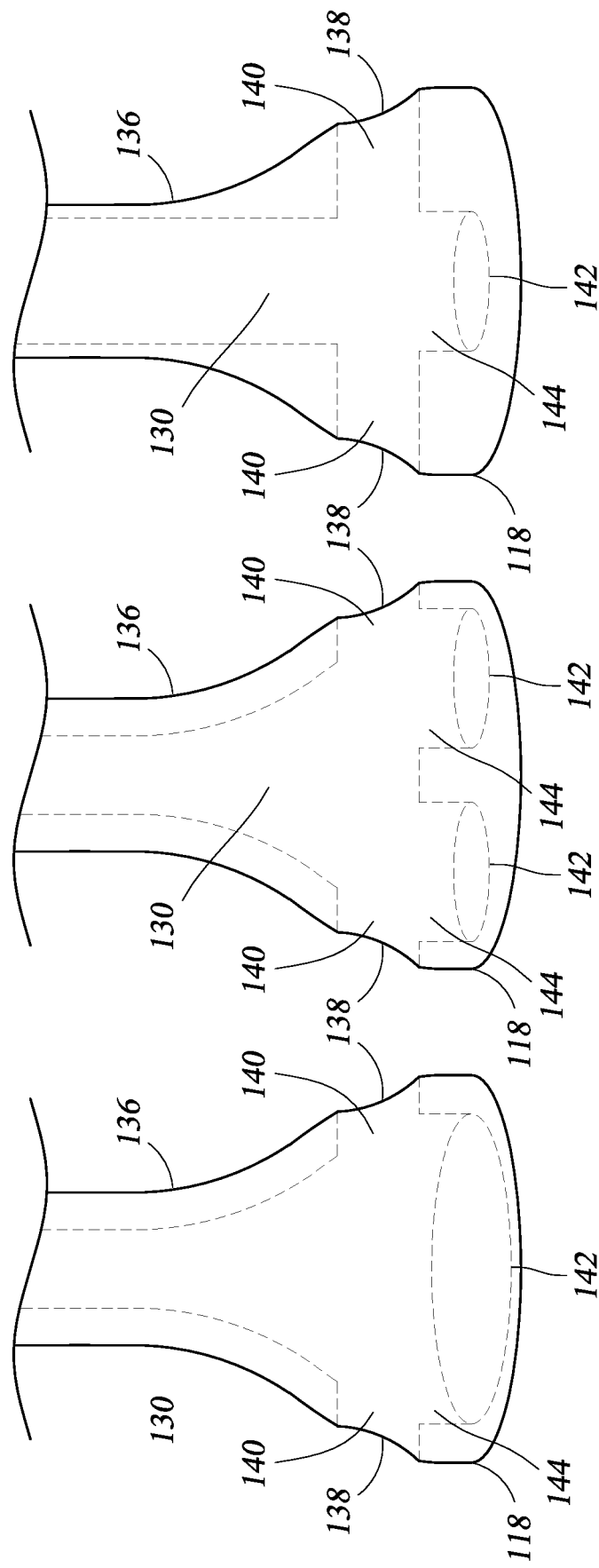

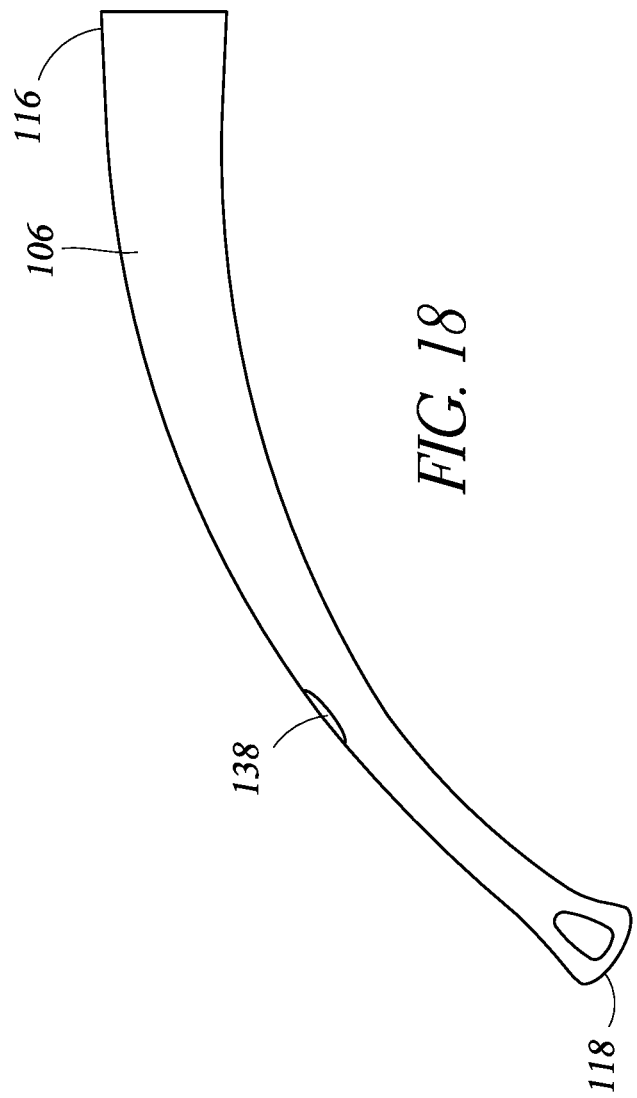
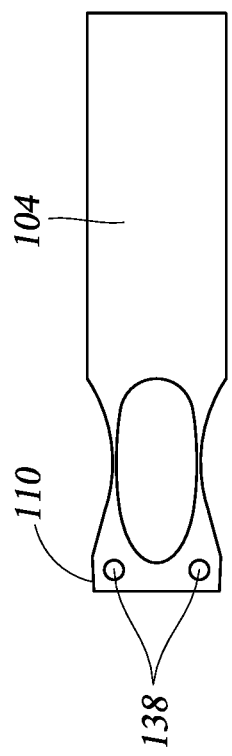
FIG. 18
FIG. 19

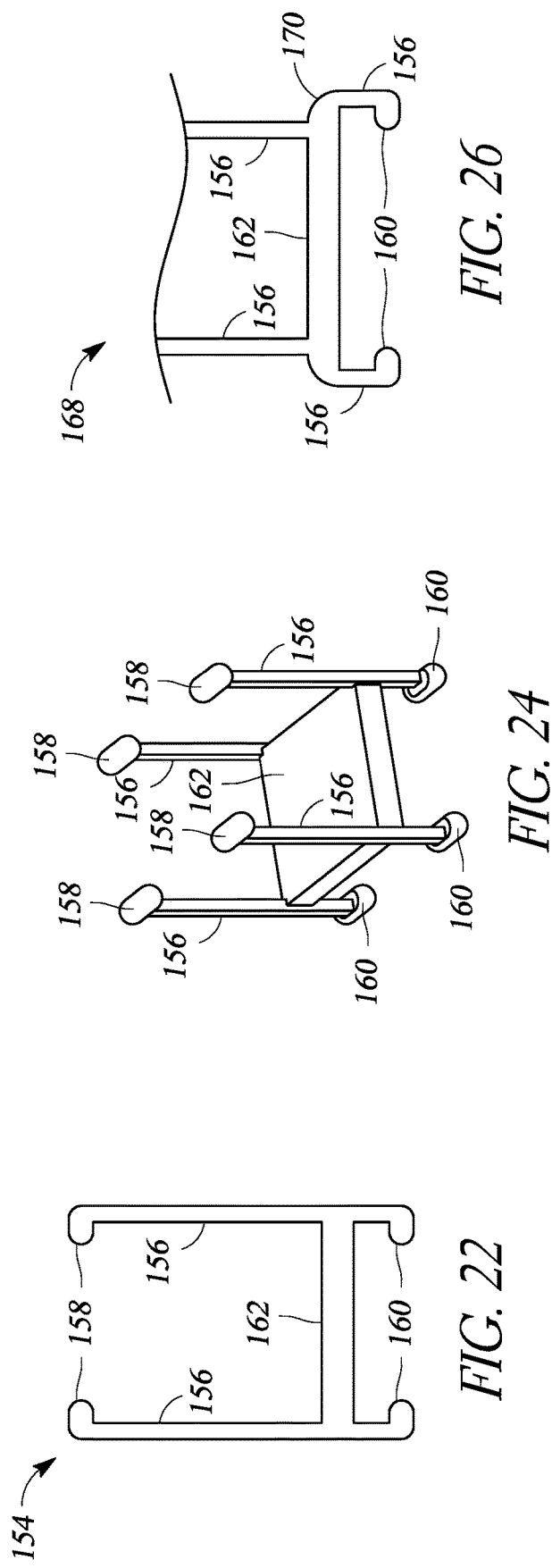

RETRACTOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation-in-part of U.S. Design patent application No. 29/807,701, filed Sep. 14, 2021, which is hereby incorporated by reference in its entirety as if fully set forth herein.

BACKGROUND

Field

The disclosures herein generally relate to devices and methods for performing retraction and evacuation in surgical procedures, including retraction of tissue as well as suction and evacuation of fluids, including gases, and particulate matter from a surgical field.

Description of the Related Art

During surgical procedures, a surgeon typically needs to gain access to an area in a patient's body, wherein the surgeon may perform any of a wide variety of procedures, often including some form of resection, repair or reconstruction. Gaining and securing access to such an area may involve an incision followed by retraction of bordering tissue and generally maintaining the incision in retracted condition during the procedure.

Retracting tissue is generally performed by using a surgical retractor. Manual (hand-held) surgical retractors are available in a variety of shapes and dimensions, and typically include a handle to manually operate the retractor and a blade to engage tissue to be held in a retracted condition. Blade shapes vary, some with narrower tissue engagement surfaces (e.g., width of 1-3 cm), some with wider tissue engagement surfaces (e.g., width of 6-8 cm), and some with multi-pronged, rake-like surfaces to engage tissue. Some retractor blades are dimensioned to reach greater depth in a surgical field, for example, into a subdiaphragmatic region. Some retractor blades have less flexibility and hence more resistance to displacement, for example, to facilitate retraction of a greater volume or multiple layers of tissue. A retractor blade may also exhibit a particular degree of curvature to reach from one side of a surgical field, downward into the field to wrap slightly underneath a thickness of tissue to be retracted laterally away from the center of the field. Other retractor blades may be flat and straight. Common manual surgical retractors include Senn, Army-Navy, Deaver, Richardson, Ribbon, Hohmann, Farabeuf and Meyerding retractors.

Retractor handles are also shaped in a variety of ways. Some retractor handles are relatively simple, and can be characterized as extending away from the blade portion in a direction parallel to the direction of lateral force to be applied to the blade during use, having the same or similar lateral cross-section as the blade and having sufficient length and straightness to be gripped and operated by a hand. Other known retractor handles may have a lateral cross-section that differs from that of the blade, such as, for example, a circular cross-sectioned handle attached to a thin, flat blade having a wide and short rectangular cross-section. Still other known retractor handles may extend from the blade in a direction perpendicular to the direction of lateral force to be applied to the retractor blade during use.

However, prior art retractor handles lack gripping comfort for a hand and lack configuration appropriate to facilitate and ease the application of the up-and-down, back-and-forth pivoting forces and the lateral pulling forces needed to effectively retract tissue, hence requiring greater muscular exertion to maintain grip and effect retraction, particular during lengthy or prolonged surgical procedures. The muscular exertion contributes to fatigue in the hand, wrist and arm, and can even lead to loss of grip on the retractor and undesirable movement or shifting of retracted tissue during a surgical procedure.

During surgical procedures, a surgical field may contain fluids that are undesirable, such as, for example, blood, purulent secretions and/or irrigation fluids. A surgical field, as well as areas in proximity to it, may also contain undesirable gases, such as, for example, plume, smoke and vaporized matter. As used herein, the term fluid will be understood to refer to any liquid, gas, vapor, aerosol or airborne particulate matter.

More than ever before, surgeons use electrosurgical instruments (ESU's) for cutting and coagulation, among other things, during surgery. Whereas cutting with a scalpel requires pressure, cutting with ESUs is virtually effortless, as it is electric current that parts tissue and not the instrument itself, with the parting of the tissue actually preceding the leading edge of the active electrode during cutting. It is estimated that ESUs are now used in 80 percent of surgical procedures. ESUs are now characterized as useful tools in all aspects of the surgical arena, from removal of warts, hair, or spider veins, to procedures involving removal of tumors, cysts, capsular bodies or other foreign bodies, to more lengthy and complex procedures such as gallbladder, orthopedic, open heart and transplant procedures.

However, there are well-documented risks associated with the use of ESUs to perform surgical procedures, including not only risks associated with the electrical current, but also risks associated with inhalation of the plume, smoke and vaporized matter created by the ESU's during surgery. Another source of dangerous smoke and aerosol in the operating room are powered instruments, such as saws and drills, used for orthopedic surgery. Surgical smoke is one of the most common and yet most overlooked hazards encountered in the operating room, and it is known to contain dangerous chemicals including benzene, formaldehyde, cyanide and ethanol, known to be respiratory irritants and carcinogens. Surgical smoke also contains viable bacteria and viruses. It has been estimated that, in an average working day of five operative procedures involving ESUs, healthcare professionals (doctors and staff) may be exposed to the equivalent of smoking 20 to 30 or more cigarettes per day. Over time, exposure to surgical plume, smoke and vaporized matter has been shown to lead to numerous afflictions, including airway inflammation, hypoxia, dizziness, coughing, headaches, tearing, nausea/vomiting, hepatitis, asthma, pulmonary congestion, chronic bronchitis, carcinoma, emphysema, and even HIV/AIDs or Covid-19 variants such as delta or omicron. Even when smoke evacuation systems are sometimes used in operating rooms, they remain far less than fully effective in reducing the associated risks.

U.S. Patent Application Publication No. US 2014/0257039 A1 discloses a retractor having a standard retractor blade and a smoke removal conduit tube attached externally to run along an outer surface of the blade. Such a system introduces complexity and clutter to the retractor, including disrupting an otherwise smooth outer surface by introducing irregular and uneven outer surface elements that can scrape, snag and/or press against tissues in undesirable and detrimental ways during surgical procedures. And its evacuation capacity is minimal.

One object of the disclosure is to improve manual retractor control and maneuverability during use.

Another object of the disclosure is to improve hand comfort and reduce muscle fatigue during manual retractor use.

Another object of the disclosure is to improve manual retractor grip during use and avoid interruption or disruption of continuous manual control of a retractor such as, for example, slippage or loss of grip, even momentarily.

Another object of the disclosure is to make more efficient use of the space occupied by a retractor in a surgical field, by accomplishing not only tissue retraction but also evacuation of plume, smoke, vaporized matter, and undesirable fluids such as, for example, blood, irrigation fluid and secretions.

Another object of the disclosure is to make efficient use of the blade structure of a retractor by incorporating within the blade structure itself a fluid passage for evacuating undesirable fluids during retraction, and further by presenting a wide field of suction in the surgical field, particularly in comparison to the width of the retractor blade. In some embodiments, a retractor blade incorporates a fluid passage within its structure, and the retractor blade advantageously uses a wide fan-shaped tip at its distal end to engage a correspondingly wide portion of tissue to be retracted while simultaneously presenting evacuation suction across a wide area in the surgical field. Evacuation suction may be simultaneously present at locations in the surgical field that are spaced apart by a distance greater than the cross-sectional width of the retractor blade at one or more points along its length. In some embodiments, the locations in the surgical field at which evacuation suction is simultaneously presented are spaced apart by a distance more than twice that of the cross-sectional width of the retractor blade at one or more points along its length, and in still further embodiments simultaneous evacuation suction locations are spaced apart by a distance more than three times that of the cross-sectional width of the retractor blade at one or more points along its length.

Another object of the disclosure is to provide visual monitoring of retractor-based evacuation of plume, smoke, vaporized matter, and undesirable fluids such as, for example, blood, irrigation fluid and secretions. In some embodiments of the disclosure, transparent material comprises at least a portion of the retractor blade, and the transparent material provides visualization of fluid being evacuated through a fluid passage incorporated in the retractor blade.

Still another object of the disclosure is to improve positioning and securing a manual retractor in a surgical field during periods of time when the retractor is not under manual control.

SUMMARY

The novel retractor provides retraction, countertraction and simultaneous aspiration of undesirable fluids, including surgical plume, smoke and vaporized matter, as well as, for example, blood, purulent secretions ("pus") and/or irrigation fluids. The novel retractor may advantageously present a wide-pattern field of suction at the floor of the surgical field as well as at elevated positions while simultaneously retracting tissue. The advantageous wide-pattern suction is facilitated by a novel fan-shaped blade end in certain embodiments. The novel retractor also provides see-through transparency features advantageously permitting visualization of undesirable fluid being evacuated through a fluid passage within the retractor blade during a surgical procedure.

The retractor, in some instances, is indicated for general surgical procedures that require retraction, but is particularly suited for:

Capsular contractures, capsulectomy of smooth or other textured silicone breast implants, as well as smooth saline breast implants; and Procedures involving tumors, cysts, tonsils and adenoids, soft scar tissue, dense scar tissue, and also procedures involving organs and their structures.

Also, the novel shape and configuration are ergonomically designed for efficiency and comfort to advantageously provide maximum flexibility without torquing wrist, hand or fingers, to allow for heightened grip and control of the retractor during use, and to allow for continuous manual retraction for long periods of time while minimizing digit, hand, wrist and arm fatigue. For example, the novel retractor facilitates lateral palmar grasp and turning and/or manipulating the retractor in a variety of ways.

In some embodiments, a retractor comprises a handle, which in turn comprises a suction source end, a blade end, a handle fluid passage formed within said handle, said handle fluid passage having a first opening closer to said suction source end than to said blade end, and having a second opening closer to said blade end than to said suction source end, and also comprising a suction port closer to said suction source end than to said blade end, said suction port configured to connect to a suction source during a medical procedure and to direct suction to said first opening of said handle fluid passage, said handle fluid passage configured to direct suction from said first opening to said second opening. The retractor also comprises a blade, which in turn comprises a proximal end connected to said blade end of said handle, a distal end configured to engage and retract tissue during said medical procedure, and a blade fluid passage formed within said blade, said blade fluid passage having a proximal opening closer to said proximal end than to said distal end, said proximal opening joined to said second opening of said handle fluid passage such that said handle fluid passage and said blade fluid passage form a continuous fluid passage. The retractor also comprises a first perforation formed in said blade and a first perforation fluid passage extending from said first perforation to said blade fluid passage, said blade fluid passage configured to direct suction to said first perforation fluid passage, said first perforation fluid passage configured to direct suction to evacuable matter external to said blade during said medical procedure, said first perforation configured to permit passage of said evacuable matter into said first perforation fluid passage for suction evacuation through said blade fluid passage and through said handle fluid passage and through said suction port. Certain embodiments correspond to a retractor wherein said handle is composed at least in part of a transparent material permitting visual observation of said evacuable matter in said handle fluid passage. Other embodiments correspond to a retractor wherein said blade is composed at least in part of a transparent material permitting visual observation of said evacuable matter in said blade fluid passage. Still further embodiments correspond to a retractor wherein said blade has a curved shape between said proximal end and said distal end such that, when said handle is held in a position above a surgical field and approximately perpendicular to a central axis of a surgical corridor of said surgical field, said curve of said blade is in a direction downward and toward the surgical field. Additional embodiments correspond to a retractor wherein a first blade width of said blade at a first point along its length differs from a second blade width of said blade at a second point along its length. Those embodiments include retractors wherein a width of said first perforation is greater than said first blade width, and wherein the distance between said first point and said proximal end of said blade is smaller than the distance between said first perforation and said proximal end of said blade. Those embodiments, in turn, include retractors wherein said first perforation is an end perforation formed in a distal tip of said blade. Those embodiments include retractors wherein said handle includes at least one depression in an outer surface of said handle in which a portion of a thumb or a portion of a finger may be positioned during use of said retractor, and also include retractors wherein said handle includes knurling ridges formed in an outer surface of said handle, and wherein said knurling ridges include at least one straight knurling ridge and at least one curved knurling ridge.

The inventive retractor may also, in some embodiments, further comprise a second perforation formed in said blade, and a second perforation fluid passage extending from said second perforation to said blade fluid passage, said blade fluid passage configured to direct suction to said second perforation fluid passage, said second perforation fluid passage configured to direct suction to evacuable matter external to said blade during said medical procedure, said second perforation configured to permit passage of said evacuable matter into said second perforation fluid passage for suction evacuation through said blade fluid passage and through said handle fluid passage and through said suction port. Those embodiments include retractors wherein the distance between said first perforation and said second perforation is greater than the length of any straight line connecting any two points along the circumference of a cross-section of said blade at a first point along its length, and wherein said first point is closer to said proximal end of said blade than either of said first or second perforations. Those embodiments, in turn, include retractors wherein the blade width of said blade at said distal end is greater than the blade width of said blade at said first point, and wherein said first and second perforations are end perforations formed in a distal tip of said blade. And those embodiments include retractors wherein the distance between said first perforation and said second perforation is greater than the distance between any two points along the circumference of any cross-section of said blade at any point along at least fifty percent of the length of said blade between said distal end and said proximal end. And those embodiments include still further retractors wherein said retractor is composed at least in part of a transparent material permitting visual observation of evacuable matter in said blade fluid passage, and also include retractors further comprising a first side perforation formed in said blade between said distal end and said proximal end, and a first side perforation fluid passage extending from said first side perforation to said blade fluid passage, said blade fluid passage configured to direct suction to said first side perforation fluid passage, said first side perforation fluid passage configured to direct suction to evacuable matter external to said blade during said medical procedure, said first side perforation configured to permit passage of said evacuable matter into said first side perforation fluid passage for suction evacuation through said blade fluid passage and through said handle fluid passage and through said suction port. Those embodiments include retractors further comprising a second side perforation formed in said blade between said distal end and said proximal end, wherein the distance between said second side perforation and said proximal end is smaller than the distance between said first side perforation and said proximal end, and a second side perforation fluid passage extending from said second side perforation to said blade fluid passage, said blade fluid passage configured to direct suction to said second side perforation fluid passage, said second side perforation fluid passage configured to direct suction to evacuable matter external to said blade during said medical procedure, said second side perforation configured to permit passage of said evacuable matter into said second side perforation fluid passage for suction evacuation through said blade fluid passage and through said handle fluid passage and through said suction port.

Some of the above embodiments include retractors wherein the distance between said first perforation and said second perforation is more than twice the distance between any two points along the circumference of any cross-section of said blade at any point along at least fifty percent of the length of said blade between said distal end and said proximal end. Some of those embodiments include retractors wherein said retractor is composed at least in part of a transparent material permitting visual observation of evacuable matter in said blade fluid passage, and some of those embodiments include retractors further comprising a first side perforation formed in said blade between said distal end and said proximal end, and a first side perforation fluid passage extending from said first side perforation to said blade fluid passage, said blade fluid passage configured to direct suction to said first side perforation fluid passage, said first side perforation fluid passage configured to direct suction to evacuable matter external to said blade during said medical procedure, said first side perforation configured to permit passage of said evacuable matter into said first side perforation fluid passage for suction evacuation through said blade fluid passage and through said handle fluid passage and through said suction port. Those embodiments include retractors further comprising second side perforation formed in said blade between said distal end and said proximal end, wherein the distance between said second side perforation and said proximal end is smaller than the distance between said first side perforation and said proximal end, and a second side perforation fluid passage extending from said second side perforation to said blade fluid passage, said blade fluid passage configured to direct suction to said second side perforation fluid passage, said second side perforation fluid passage configured to direct suction to evacuable matter external to said blade during said medical procedure, said second side perforation configured to permit passage of said evacuable matter into said second side perforation fluid passage for suction evacuation through said blade fluid passage and through said handle fluid passage and through said suction port.

Some of the above embodiments include retractors further comprising a handle perforation formed in said handle between said blade end and said suction source end, a handle perforation fluid passage extending from said handle perforation to said handle fluid passage, said handle fluid passage configured to direct suction to said handle perforation fluid passage, said handle perforation fluid passage configured to direct suction to evacuable matter external to said handle during said medical procedure, said handle perforation configured to permit passage of said evacuable matter into said handle perforation fluid passage for suction evacuation through said handle fluid passage and through said suction port. Those embodiments include retractors wherein said handle includes at least one depression in an outer surface of said handle in which a portion of a thumb or a portion of a finger may be positioned during use of said retractor, and also include embodiments wherein said handle includes knurling ridges formed in an outer surface of said handle, and wherein said knurling ridges include at least one straight knurling ridge and at least one curved knurling ridge.

Some of the above embodiments include retractors wherein the distance between said first perforation and said second perforation is more than three times the distance between any two points along the circumference of any cross-section of said blade at any point along at least fifty percent of the length of said blade between said distal end and said proximal end. Some of those embodiments further comprise a first side perforation formed in said blade between said distal end and said proximal end, and a first side perforation fluid passage extending from said first side perforation to said blade fluid passage, said blade fluid passage configured to direct suction to said first side perforation fluid passage, said first side perforation fluid passage configured to direct suction to evacuable matter external to said blade during said medical procedure, said first side perforation configured to permit passage of said evacuable matter into said first side perforation fluid passage for suction evacuation through said blade fluid passage and through said handle fluid passage and through said suction port. Those embodiments, in turn, include retractors further comprising a second side perforation formed in said blade between said distal end and said proximal end, wherein the distance between said second side perforation and said proximal end is smaller than the distance between said first side perforation and said proximal end, and a second side perforation fluid passage extending from said second side perforation to said blade fluid passage, said blade fluid passage configured to direct suction to said second side perforation fluid passage, said second side perforation fluid passage configured to direct suction to evacuable matter external to said blade during said medical procedure, said second side perforation configured to permit passage of said evacuable matter into said second side perforation fluid passage for suction evacuation through said blade fluid passage and through said handle fluid passage and through said suction port.

In other embodiments, a suctioning retractor comprises a handle having a suction end and a blade end, a handle fluid passage inside the handle, the handle fluid passage having a first opening to receive suction and a second opening to direct at least some of the suction received at the first opening, a suction port connected to the suction end, the suction port configured to connect to a suction source during a medical procedure and to direct suction to the first opening, a blade having a proximal end and a distal end, the proximal end connected to the blade end of the handle and the distal end configured to engage and retract tissue during the medical procedure, a blade fluid passage inside the blade, the blade fluid passage having a proximal opening joined to the second opening to receive suction directed by the second opening, a first perforation formed in an outer surface of the blade, and a first perforation fluid passage extending from the first perforation to the blade fluid passage, the blade fluid passage configured to direct suction to the first perforation fluid passage, the first perforation fluid passage configured to direct suction to evacuable matter external to the blade during the medical procedure, the first perforation configured to permit passage of the evacuable matter into the first perforation fluid passage for suction evacuation through the blade fluid passage and through the handle fluid passage and through the suction port, and a first depression formed in an outer surface of the handle, the depression configured to receive a portion of a thumb or a finger positioned therein during the medical procedure. Those embodiments include retractors wherein (1) the handle includes knurling ridges formed in an outer surface of the handle, the knurling ridges configured to engage a portion of a hand, (2) wherein the blade is curved along its length between the proximal and distal ends such that, when the axis of the length of the handle is positioned perpendicular to a surgical corridor, the distal end of the blade curves downward toward a surgical field corresponding to the surgical corridor, (3) wherein the first perforation defines a first perforation opening on the outer surface of the blade such that the distance between two different points along the perimeter of the opening is greater than the distance between any two points along the circumference of any cross-section of the blade at any point along at least fifty percent of the length of the blade between its proximal and distal ends, or (4) wherein the first perforation defines a first perforation opening on the outer surface of the blade such that the distance between two different points along the perimeter of the opening is more than twice the distance between any two points along the circumference of any cross-section of the blade at any point along at least fifty percent of the length of the blade between its proximal and distal ends. Those embodiments include suctioning retractors further comprising a second perforation formed in an outer surface of the blade, and a second perforation fluid passage extending from the second perforation to the blade fluid passage, the blade fluid passage configured to direct suction to the second perforation fluid passage, the second perforation fluid passage configured to direct suction to evacuable matter external to the blade during the medical procedure, the second perforation configured to permit passage of the evacuable matter into the second perforation fluid passage for suction evacuation through the blade fluid passage and through the handle fluid pas sage and through the suction port. Those embodiments include suctioning retractors wherein the distance between the first and second perforations is greater than the distance between any two points along the circumference of any cross-section of the blade at at least one point along a length of the blade between its proximal and distal ends, and include additional embodiments wherein the distance between the first and second perforations is greater than the distance between any two points along the circumference of any cross-section of the blade at any point along at least fifty percent of the length of the blade between its proximal and distal ends. Those additional embodiments, in turn, include suctioning retractors wherein the first and second perforations are located within two centimeters of the distal end of the blade.

Some of the above embodiments include suctioning retractors wherein the distance between the first and second perforations is more than twice the distance between any two points along the circumference of any cross-section of the blade at at least one point along a length of the blade between its proximal and distal ends, and include additional embodiments wherein the distance between the first and second perforations is more than twice the distance between any two points along the circumference of any cross-section of the blade at any point along at least fifty percent of the length of the blade between its proximal and distal ends. Those additional embodiments include suctioning retractors wherein the first and second perforations are located within two centimeters of the distal end of the blade.

BRIEF DESCRIPTION OF THE DRAWINGS

FIG. 1 illustrates a representation of a side view of a retractor in accordance with one or more embodiments.

FIG. 2 illustrates a representation of a top view of a retractor in accordance with one or more embodiments.

FIG. 9 illustrates a perspective representation of a blade and a blade fluid passage in accordance with one or more embodiments.

FIG. 10 illustrates a perspective representation of a blade and a blade fluid passage in accordance with one or more embodiments.

FIG. 13 illustrates a representation of a fanned tip with internal fluid passage in accordance with one or more embodiments.

FIG. 14 illustrates a representation of a fanned tip with internal fluid passage in accordance with one or more embodiments.

FIG. 15 illustrates a representation of a fanned tip with internal fluid passage in accordance with one or more embodiments.

FIG. 18 illustrates a representation of a side view of a blade in accordance with one or more embodiments.

FIG. 19 illustrates a representation of a top view of a handle 104 in accordance with one or more embodiments.

FIG. 22 illustrates a representation of a front view of a retractor clip in accordance with one or more embodiments.

FIG. 23 illustrates a representation of a side view of a retractor clip in accordance with one or more embodiments.

FIG. 24 illustrates a representation of a perspective view of a retractor clip in accordance with one or more embodiments.

FIG. 25 illustrates an enlarged view of a representation of a tab in accordance with one or more embodiments.

FIG. 26 illustrates a representation of a front view of a retractor clip in accordance with one or more embodiments.

DETAILED DESCRIPTION

Figure 3:
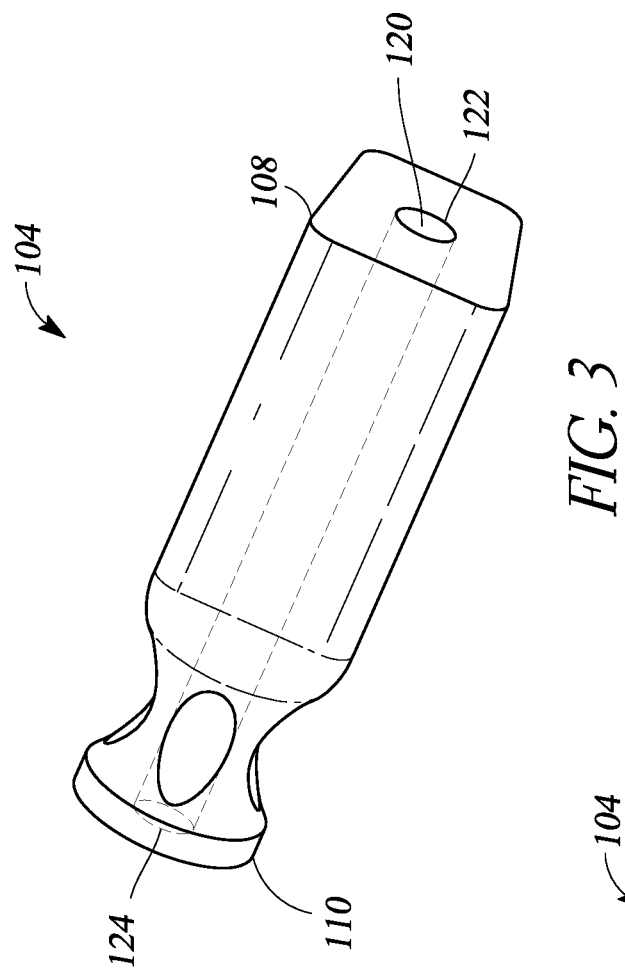
FIG. 3 illustrates a perspective view of a representation of a retractor handle in accordance with one or more embodiments.

FIG. 1 illustrates a representation of a side view of a retractor 102 in accordance with one or more embodiments. FIG. 2 illustrates a representation of a top view of a retractor 102 in accordance with one or more embodiments. The retractor 102 includes a handle 104 and a blade 106. The handle 104 has a suction source end 108 and a blade end 110. The blade 106 has a proximal end 116 and a distal end 118.

In some embodiments, the handle 104 and the blade 106 are made from the same material, such as, for example, medical grade metal, plastic, ceramic or carbon fiber. In other embodiments, the handle 104 and the blade 106 are made, respectively, from different materials selected from any metals, plastics, ceramics, carbon fiber or other compositions appropriate for medical use, and particularly for use within a surgical field.

The handle comprises a suction port 112 that has a connection end 113 that connects to a source of suction. The source of suction may be standard operating room suction, which may be regulated by a regulator, and which may be applied to an evacuation canister and, from there, applied by suction hose to the suction port 112. The suction applied to the suction port may be 200 mmHg, but could be more or less depending on the needs of the surgical procedure. As will be understood to a person of ordinary skill in the art, the suction port 112, in some embodiments, comprises a tube, approximately 2-4 cm long, but could be shorter or longer, configured to be removably and sealingly connected to standard-sized suction tubing, such as, for example, that which is commonly present in an operating room.

Figure 4:
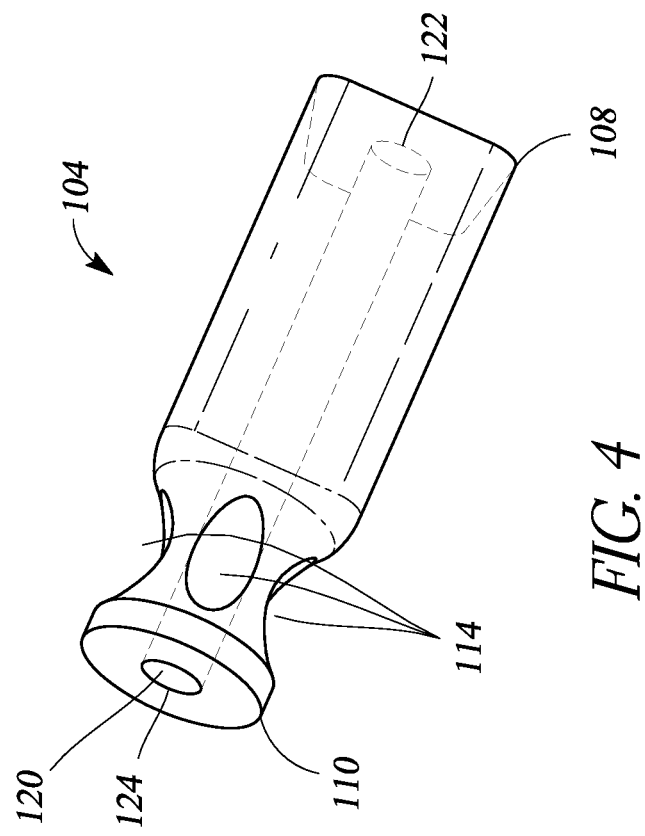
FIG. 4 illustrates a perspective view of a representation of a retractor handle in accordance with one or more embodiments.

FIGS. 3 and 4 illustrate first and second perspective views of a representation of a retractor handle 104 in accordance with one or more embodiments. The handle 104 comprises one or more elliptical, concave depressions 114 designed to comfortably receive a thumb or fingertip of an operator of the retractor. While operating the retractor, the operator may rest a thumb and/or one or more fingers in the one or more depressions 114, thus adding to the comfort and secure nature of the grip on the handle 104.

The handle 104 comprises a handle fluid passage 120 having a first opening 122 located at or near the suction source end 108. The handle fluid passage 120 has a second opening 124 located at or near the blade end. The handle fluid passage 120 is contained within the interior of the handle 104 and runs from its suction source end 108 to its blade end 110.

In some embodiments, the handle fluid passage 120 has a circular cross-section of uniform diameter along the length of the passage. As used herein, cross-section refers to the shape defined on an imaginary plane where it intersects an object at a right angle to a lengthwise axis of the object, and wherein the object can be a solid body, or can be a volume of fluid or gas, or can be a solid body with a volume of fluid or gas contained in the solid body.

Figure 6:
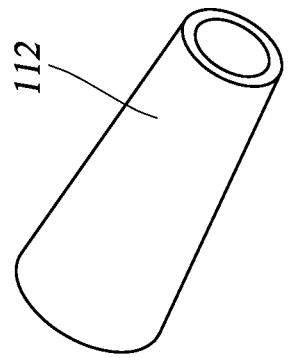
FIG. 6 illustrates a representation of a suction port in accordance with one or more embodiments.
Figure 7:
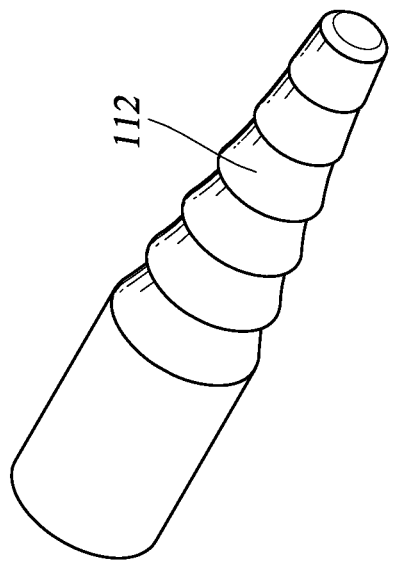
FIG. 7 illustrates a representation of a suction port in accordance with one or more embodiments.
Figure 5:
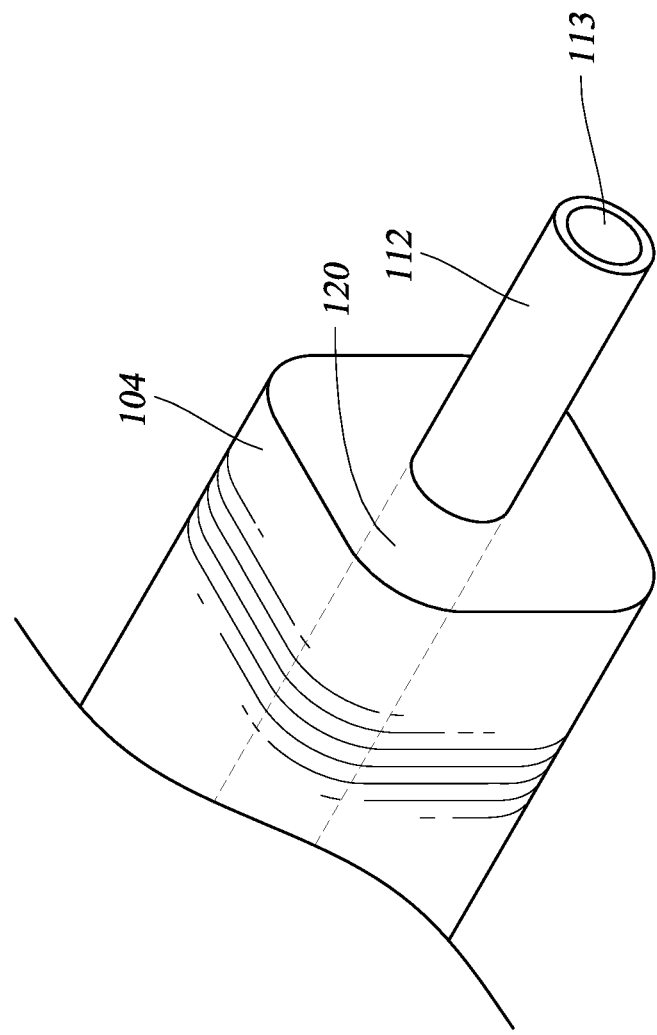
FIG. 5 illustrates a representation of a suction port of a retractor handle in accordance with one or more embodiments.

FIG. 5 illustrates a representation of a suction port 112 at the suction source end 108 of the retractor handle 104. The suction port 112, in some embodiments, is a roughly cylindrical tube having an inner cylindrical passage with a circular cross-section of uniform diameter, and which, at the connection end 113, has an outer diameter that permits an open end of standard-sized suction tubing to be forced onto the connection end 113 with a reasonable level of manual force. To more easily effect such connection, the cylindrical connection end 113 may be tapered, for example, as the illustration of FIG. 6 represents. To prevent slippage of the suction tubing from the connection end 113, the suction port 112 may comprise one or more raised circumferential ridges around its outer surface to engage the inner surface of the suction tubing, which will increase the friction present in the connection. FIG. 7 illustrates a representation of an embodiment of the suction port 112, which comprises a series of tapered cylinders, each having slightly decreasing outer diameters toward the connection end 113. Such embodiment (and others like it) accommodates connection to suction tubing of varying sizes, such as, for example, suction tubing having a diameter of 3 mm to 11 mm.

Figure 8:
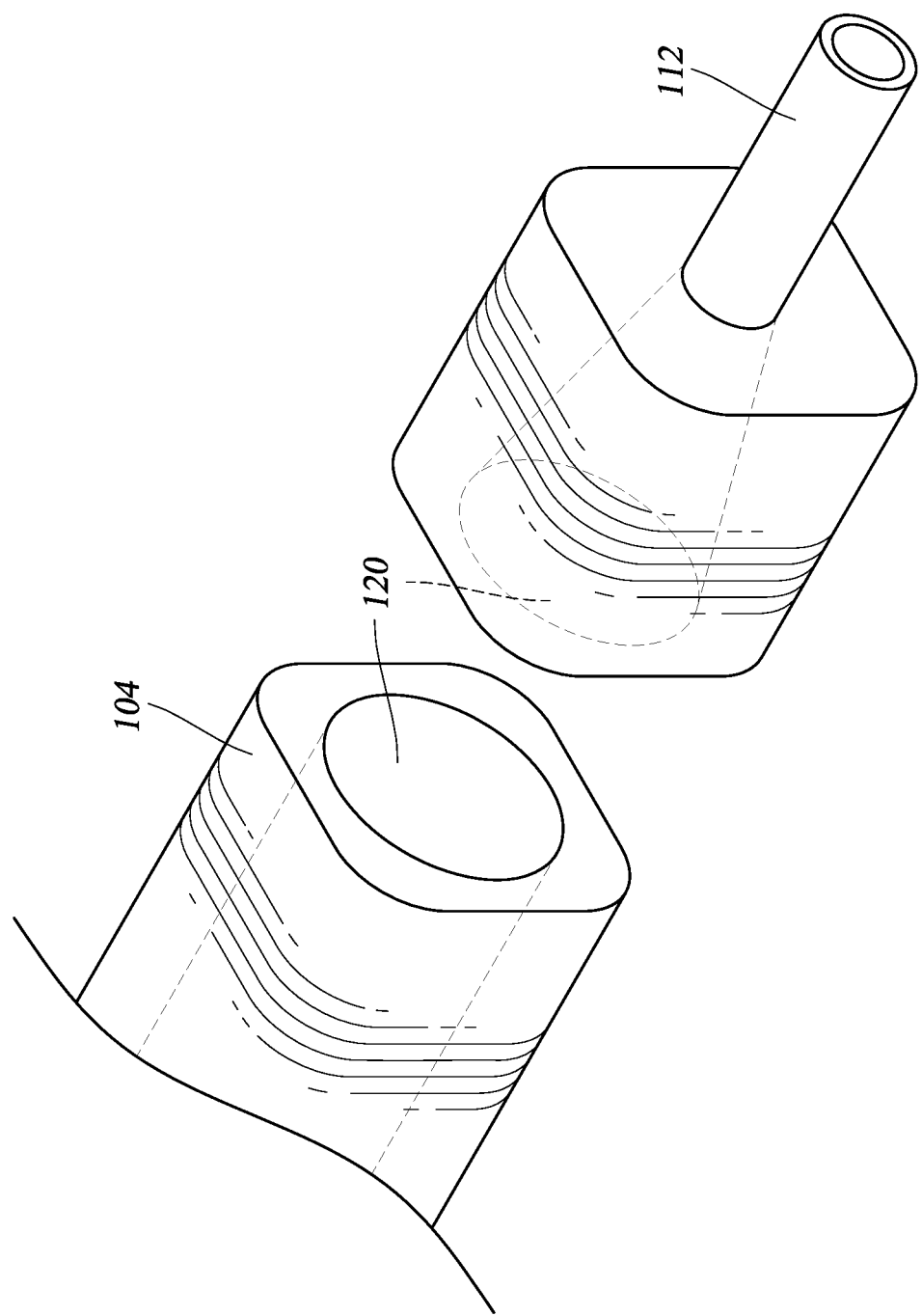
FIG. 8 illustrates a representation of a split view of a handle and a handle fluid passage in accordance with one or more embodiments.

FIG. 8 illustrates a representation of a split view of a handle 104 in some embodiments wherein a cross-section of the handle fluid passage 120 is elliptical along at least a portion of its length. In still other embodiments the cross-section of the handle fluid passage 120 may be a shape other than a circle or an ellipse. In further embodiments, the shape and/or area of the cross-section of the handle fluid passage 120 may change along its length.

Turning back to FIG. 4, it illustrates embodiments wherein a cross-section of the handle 104, between the suction source end 108 and the one or more depressions 114, is square with rounded corners. Such a cross-section results in a shape of the handle 104, which, advantageously, can be both comfortably and securely gripped by the hand of a person operating the retractor 102.

Other cross-sections along this segment of the handle (i.e., between the suction source end 108 and the one or more depressions 114) are contemplated by the inventor, such as, for example, a circular or elliptical cross-section or a polygonal cross-section, with or without rounded corners.

In some embodiments, the handle 104 has a circular or elliptical cross-section in the segment of the handle 104 between the blade end 110 and the one or more depressions 114. Such cross-section at the blade end 110 matches the cross-section of the blade 106 at its proximal end 116 so as to form a smooth outer circumferential surface at the junction of the handle 104 and the blade 106.

Directing attention to FIG. 1, the suction port 112 conducts suction from its connection end 113 to the first opening 122 of the handle fluid passage 120, and the handle fluid passage 120 conducts suction from the first opening 122 to the second opening 124.

FIGS. 9 and 10 illustrate perspective representations of a blade 106 in accordance with one or more embodiments. The blade 106 comprises a blade fluid passage 130 having proximal opening 132 at or near the proximal end 116, and has a distal opening 134 at or near the distal end 118. The proximal end 116 is joined to the blade end 110 of the handle 104 such that the handle fluid passage 120 and the blade fluid passage 130 form a continuous fluid passage.

In some embodiments, the handle 104 is approximately 10 cm long from its suction source end 108 to its blade end 110. In some embodiments wherein the handle 104 comprises one or more depressions 114, the distance between the suction source end 108 and the depressions 114 is approximately 7 cm. In embodiments wherein the handle 104 and the blade 106 are formed using a single, continuous body of material, and there is no discernable surface interruption to mark a boundary between the handle 104 and the blade 106, the proximal end 116 of the blade 106 may be a point approximately 10 cm from the suction source end 108 of the handle 104. It will be appreciated that that distance may be larger in other embodiments wherein the handle 104 may be configured to accommodate a larger hand. In other embodiments wherein the blade 106 is a separate component that is joined to the handle 104, the point constituting the blade end 110 of the handle 104 and the proximal end 116 of the blade 106 may be readily discerned.

In some embodiments, the blade 106 has a curved shape between its proximal end 116 and its distal end 118 such that, when the blade 106 is connected to the handle 104, and when the handle 104 is held in a position above a surgical field and perpendicular to a central axis of a surgical corridor of the surgical field, the curve of the blade 106 is in a direction downward and toward the surgical field. A surgical corridor may be understood as an approach vector, from a position outside a patient's body to a position inside a patient's body, corresponding to an access path that a surgeon may create and follow to reach a patient's bones or tissues involved in a medical procedure. Advantageously, the curve of the blade 106 facilitates easier maneuvering of the blade 106 to position its distal end 118 to the point of retraction and fluid evacuation in the surgical field.

Figure 11:
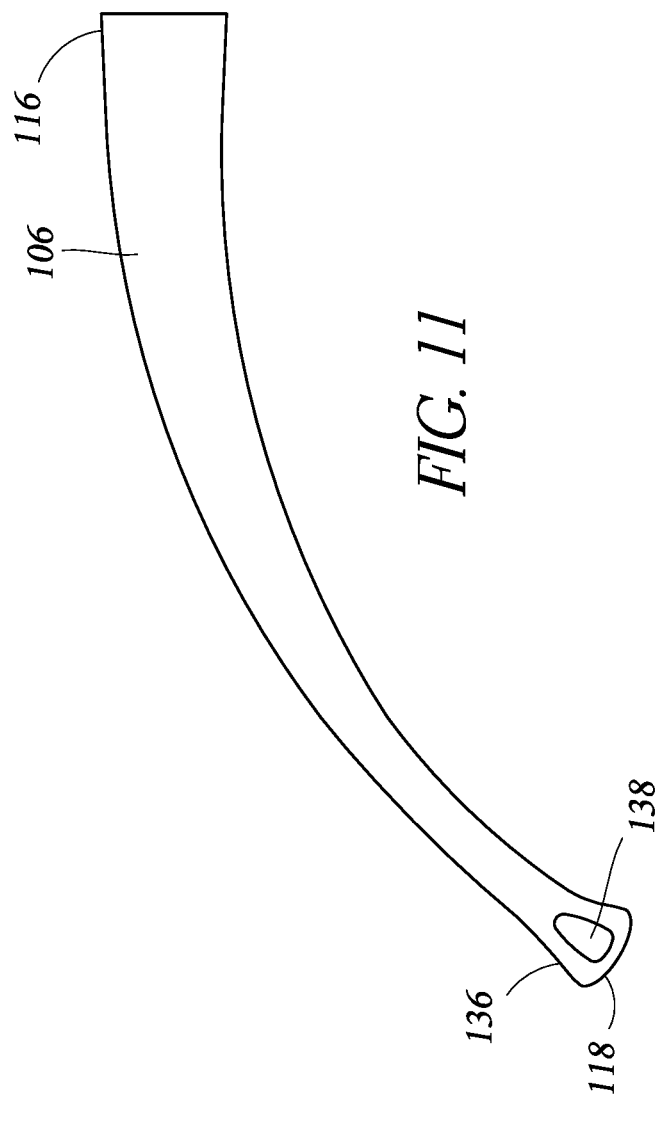
FIG. 11 illustrates a representation of a side view of a blade in accordance with one or more embodiments.
Figure 12:
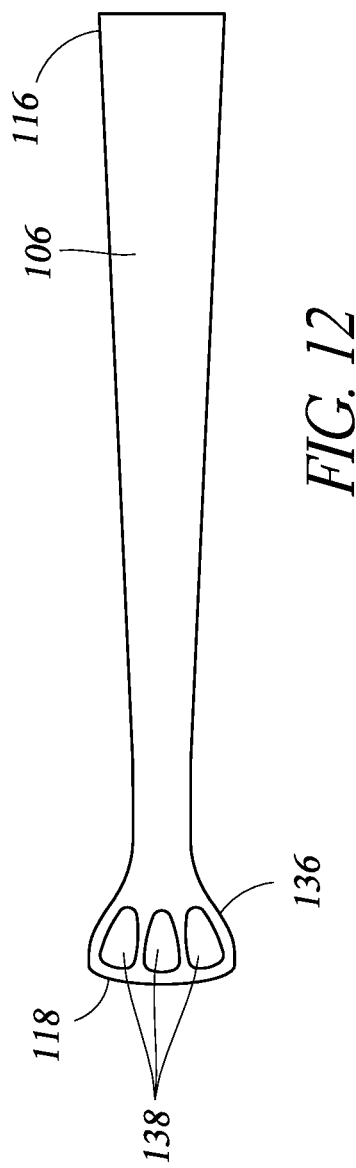
FIG. 12 illustrates a representation of a top view of a blade in accordance with one or more embodiments.

FIGS. 11 and 12 illustrate respectively a representation of a side view and a top view of the blade 106 in accordance with one or more embodiments. The blade 106 comprises a fanned (or fan-shaped) tip 136. The fanned tip 136 may advantageously contact and hold in a displaced condition a wide area of tissue during retraction, with the narrower portion of the blade 106 occupying less space in a surgical field than it would if it were of the same width as the fanned tip 136. The fanned tip 136 may, in some embodiments, have a cross-section wider (more than twice as wide in some embodiments, and more than three times as wide in other embodiments) in at least one dimension than other cross-sections along the length of the blade closer to the proximal end 116. Cross-sections of the fanned tip 136, may in some embodiments, gradually increase in width in at least one dimension the closer each is to the distal end 118.

The fanned tip 136, in some embodiments, includes one or more perforations 138, each of which forms a fluid passage between the blade fluid passage 130 and evacuable matter (not pictured) external to said blade 106. As used herein, evacuable matter includes undesirable fluids, including surgical plume, smoke and other vaporized or particulate matter which presents health risks to doctors and staff present in an operating room and which, for example, is created by the use of ESUs now in prevalent use in a large number of surgical procedures, and evacuable matter additionally includes blood, irrigation fluid, secretions (including purulent secretions and pus) and other surgical field fluids, which, when evacuated, increases exposure of the operative wound, improves visualization into the surgical field, reduces lubricating effects (slipperiness) on tissues undergoing repair or removal, and/or hastens healing following completion of a surgical procedure.

The blade fluid passage 130 conducts suction to the one or more perforations 138, and each of the one or more perforations 138 directs suction to evacuable matter external to the blade 106. Each of the one or more perforations may have a circular shape, an elliptical shape or a true or approximate polygonal shape, such as, for example, a triangle, rectangle or trapezoid, any of which may have rounded corners.

In some embodiments, the blade fluid passage 130 has a circular cross-section of uniform diameter along the length of the passage between the fanned tip 136 and the proximal end 116. In some embodiments, the blade fluid passage 130 has an elliptical cross-section along the length of the passage between the fanned tip 136 and the distal end 118, wherein the elliptical cross-sections in that segment of the blade will be greater in at least one dimension the closer the cross-section is to the distal end 11. In this manner, in some embodiments, the blade fluid passage 130 may widen or fan out in relative conformance to the shape of the fanned tip 136.

In some embodiments, the blade fluid passage 130 has a circular cross-section of uniform diameter along the length of the entire passage from the proximal end 116 to the distal end 118. In still further embodiments, the shape and/or area of the cross-section of the blade fluid passage 130 may change along its length.

FIG. 13 illustrates a representation of a fanned tip 136, wherein the blade fluid passage 130 (indicated with dotted lines) flares outward toward and at the distal tip 118 as does the outer shape of the blade 106 at the fanned tip 136. The blade width of the blade 106 at its fanned tip 136 is greater than the blade width of the blade 106 at other points along its length toward the proximal end 116, with the understanding that blade width, as used herein, means a cross-sectional dimension of the blade 106 that is approximately perpendicular to the direction of a retraction force applied to the retractor and is approximately parallel to a plane corresponding to the bodily surface within which the surgical field is formed.

Each of the one or more side perforations 138 forms a fluid passage 140 between the blade fluid passage 130 and evacuable matter (not pictured) external to said blade 106, the length of such fluid passage 140 being at least the thickness of the wall of the blade 106 at the point of the respective perforation(s) 138. As FIG. 13 further illustrates, an end perforation 142 forms a fluid passage 144 into the blade fluid passage. End perforations 142 are formed at the distal tip of the blade 106, while side perforations 138 are formed in the wall of the blade 106 proximal to the distal end 118. In some embodiments, including the one depicted in FIG. 13, the opening of an end perforation 142 is larger in area than an opening in the one or more side perforations 138. Some embodiments do not include an end perforation, and other embodiments do not include a side perforation.

FIG. 14 illustrates a representation of a fanned tip 136 in embodiments wherein the blade fluid passage 130 (indicated with dotted lines) flares outward toward the distal tip 118, but the flaring terminates just short of the distal tip 118, and the fanned tip 136 has two end perforations 142, each forming a fluid passage 144 between the blade fluid passage 130 and evacuable matter (not pictured) external to said blade 106. In the embodiments of FIG. 14, each of the two end perforations 142 has an opening that has the same area as each of two side perforations 138, but it will be appreciated that the size (area) of any of these perforation openings may differ from that of one or more other perforations.

FIG. 15 illustrates a representation of a fanned tip 136 in some embodiments wherein the blade fluid passage 130 (indicated with dotted lines) maintains a circular cross-section of the same size along the length of the fanned tip 136 and does not flare or narrow at any point along that length. FIG. 15 further illustrates an end perforation 142 that forms a fluid passage 144 between the blade fluid passage 130 and evacuable matter (not pictured) external to the blade 106. FIG. 15 further illustrates side perforations 138, each forming a fluid passage 140 between the blade fluid passage 130 and evacuable matter (not pictured) external to said blade 106. In the embodiments of FIG. 15, the end perforation 142 has an opening of the same size (area) as each of two side perforations 138, but it will be appreciated that the size of any of these perforation openings may differ from that of one or more other perforations.

The outer surfaces of the handle 104, the blade 106, including the fanned tip 136, advantageously have rounded and beveled edges to minimize damage to tissue and effect atraumatic suction.

During operation, the retractor 102 may receive suction originating from a suction source, which suction is propagated through the suction port 112, through the handle fluid passage 120, through the blade fluid passage 130, and through the perforations 138, 142. The perforations 138, 142 present the suction at the surgical field, and the flow of the suction is away from the surgical field and into and through the fluid passages of the retractor 102. Suction source may provide suction at 200 mmHg for a number of surgical procedures, but could be less or more, such as up to 500 mmHg in some applications. Flow rate may be 40 liters per minute, but could be less or more depending upon a particular surgical procedure and upon the suction needs during such procedure. Suction regulators may be used to set suction to safe levels such as the minimum suction needed for the procedure. If a collection canister is being used, it may have a shut-off means such as a float.

The perforations 138, 142, direct suction to evacuable matter external to the blade 106. The size of the openings of each of the perforations 138, 142 regulates the size of items of evacuable matter that pass through the perforations and into the blade fluid passage 130 and which are thereby evacuated from a surgical field by the retractor 102.

Embodiments differ in terms of the number of perforations 138, 142, which can range from 1 to hundreds. Some embodiments have one or more perforations with circular openings, some have perforations with elliptical openings, some have perforations with openings shaped like rounded triangles, and still others have perforations with openings shaped like slots with rounded corners. It will be appreciated that perforations can be used that have openings shaped otherwise, and the disclosure is not limited by the shapes of perforation openings. Still other embodiments have perforations with differently-shaped openings.

In embodiments having at least 100 perforations 138, 142, the diameters of the circular perforation openings range from 1 mm to 5 mm, providing circular areas ranging from approximately 0.8 mm$^2$ to 20 mm$^2$. In embodiments having greater than 10 and less than 100 perforations 138, 142, the diameters of the circular perforation openings range from 2 mm to 6 mm, providing circular areas ranging from approximately 3 mm$^2$ to 30 mm$^2$. In embodiments having 10 or fewer perforations, the diameters of the circular perforation openings range from 4 mm to 8 mm, providing circular areas ranging from approximately 12 mm$^2$ to 50 mm$^2$. In each of these three categories of perforation numbers (namely (1) greater than 100, (2) greater than 10 and less than 100, and (3) 10 or fewer), it is contemplated that differently shaped perforation openings, such as ellipses, may be used, but the shapes will be dimensioned to maintain the area ranges provided above in connection with circular-shaped openings. Embodiments are also contemplated wherein, in any of the three categories of perforation numbers, perforations having openings of even greater area than those mentioned above may be used.

Figure 16:
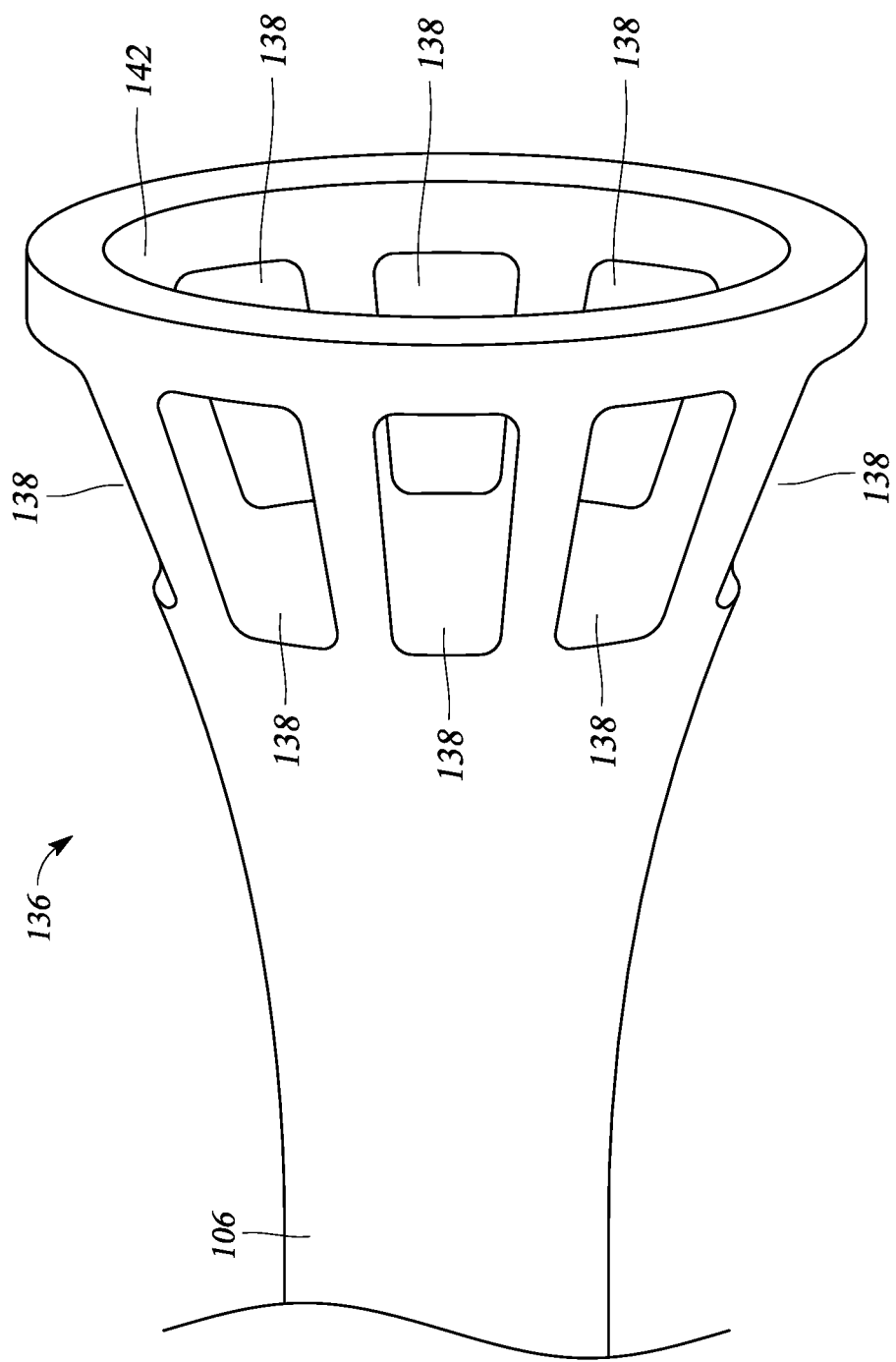
FIG. 16 illustrates a representation of a fanned tip with perforations in accordance with one or more embodiments.

FIG. 16 illustrates a representation of a fanned tip 136 in accordance with one or more embodiments. The fanned tip 136 in these embodiments has a roughly elliptical circumference at its distal end measuring approximately 2 cm×8 mm and comprises an end perforation 142 having a roughly elliptical shaped opening measuring approximately 16 mm×4 mm. In some of these embodiments the longer sides of the elliptical shaped tip and the elliptical end perforation approach straight lines. The fanned tip 136 in these embodiments has eight side perforations 138 arranged around its circumference, each side perforation having an opening shaped as a rectangle with rounded corners, each rectangle measuring approximately 5 mm×2 mm, with the longer dimension oriented parallel to the length of the blade 106, and with a short side located approximately 2 mm from the distal end of the fanned tip 136. Three side perforations 138 are spaced roughly evenly apart along each of the two longer sides of the elliptical circumference of the fanned tip 136, and one side perforation 138 is located on each of the two shorter sides of the elliptical circumference. During evacuation, the 5 mm-long side perforations 138 advantageously act as suction vents, which prevent collapse of fluid passages within the retractor 102 if and when the end perforation 142 engages liquids or tissues, and at the same time evacuate dangerous plume, smoke and vaporized matter and other evacuable matter. It will be appreciated that the dimensions and locations of the perforations may be altered somewhat without departing from the effectiveness of these embodiments.

Figure 17:
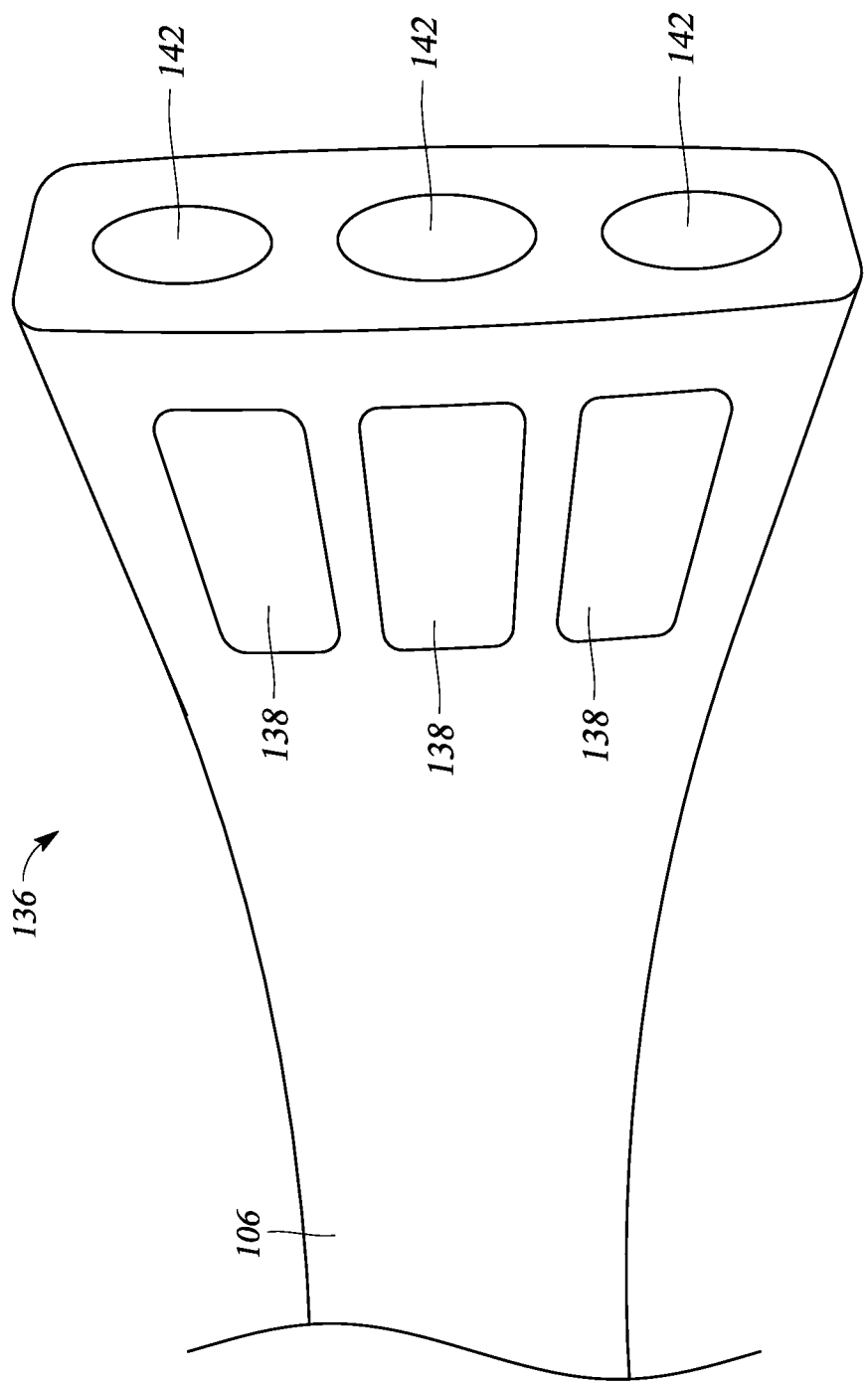
FIG. 17 illustrates a representation of a fanned tip with perforations in accordance with one or more embodiments.

FIG. 17 illustrates a representation of a fanned tip 136 in accordance with one or more embodiments. The fanned tip 136 in these embodiments has a roughly rectangular circumference, which, at its distal end, is shaped as a rectangle with rounded corners measuring approximately 2 cm×8 mm and comprises three end perforations 142, each having a circular shaped opening measuring 5 mm in diameter. Other versions of these embodiments may have only two end perforations or only one end perforation which may be elliptical and fit within the rectangular area of the distal end. The fanned tip 136 in these embodiments has eight side perforations 138 arranged around its circumference, each side perforation having an opening shaped as a rectangle with rounded corners, each rectangle measuring approximately 5 mm×2 mm, with the longer dimension oriented parallel to the length of the blade 106, and with a short side located approximately 2 mm from the distal end of the fanned tip 136. Three side perforations 138 are spaced roughly evenly apart on each of the two longer sides of the rectangular circumference of the fanned tip 136, and one side perforation 138 is located on each of the two shorter sides of the rectangular circumference (FIG. 17 illustrates three of the side perforations 138 along one of the longer sides of the fanned tip 136). During evacuation, the 5 mm-long side perforations 138 advantageously act as suction vents, which prevent collapse of fluid passages within the retractor 102 when the end perforations 142 engage liquids or tissues, and at the same time evacuate dangerous plume, smoke and vaporized matter and other evacuable matter. In some of these embodiments, the blade 106 has a circular cross-section as has been explained. In others of these embodiments, the blade 106 has a cross-section shaped roughly like a square with rounded corners, wherein the blade 106 narrows along its length from the proximal end 116 to the beginning of the fanned tip 136. In these embodiments, the handle 104, at the blade end 110, has the same cross-section shape and dimension as the blade 106 at the proximal end 116, such that the handle 104 and blade 106 join smoothly and seamlessly. In still further of these embodiments, the blade 106 may have an elliptical cross-section or rectangular-shaped cross-section (e.g., with rounded corners), which blade 106 narrows from the proximal end 116 to the beginning of the fanned tip 136, wherein the handle 104 has a cross-section at the blade end 110 shaped to join smoothly and seamlessly with the blade 106 at its proximal end 116.

The fanned tip 136, and particularly at the distal tip 118, advantageously presents a wide pattern of suction, spanning nearly 2 cm, into the floor of the surgical field. The fanned tip 136, at the distal end 118, may have one end perforation 142 that is up to 18 mm in width, as illustrated in FIG. 16, or alternatively, may have a plurality of end perforations 142, arranged to span a distance of 18 mm along the width of the fanned tip 136, such as, for example, the three end perforations 142 illustrated in FIG. 17. Advantageously, the 2 cm width of the fanned tip 136 at the distal end 118 facilitates a wide pattern of suction at the surgical field, which may comprise many different patterns and sizes of perforations, such as for example, 4 perforations having circular openings with a diameter of 3 mm, or a zig-zag pattern of 6 perforations having circular openings with a diameter of 2 mm, or a group of perforations having openings of differing sizes. The plurality of side perforations 138 also take advantage of the width of the fanned tip to facilitate a wide pattern of suction presented at a higher elevation in the surgical field to evacuate plume, smoke and vaporized matter as well as undesirable liquids.

Additional embodiments are contemplated in which the fanned tip 136 spreads even wider, such as, for example, up to 3 cm, 4 cm or 5 cm or even wider. Embodiments provide advantageous efficiency, including in terms of the wide pattern of evacuation suction presented in the surgical field as it compares to the corresponding and far narrower width of the retractor blade 106. In one or more embodiments, the fanned tip 136 simultaneously presents evacuation suction at locations in the surgical field that are spaced apart by a distance greater than the cross-sectional width of the retractor blade at at least one point along its length. In some of these embodiments, the locations in the surgical field at which evacuation suction is simultaneously presented are spaced apart by a distance more than twice that of the cross-sectional width of the retractor blade at at least one point along its length, and in still further of these embodiments evacuation suction is presented simultaneously at locations in the surgical field spaced apart by a distance more than three times that of the cross-sectional width of the retractor blade at at least one point along its length. Accordingly, the blade of the novel retractor may occupy a narrow space as it extends into the depth of the surgical field, while at the same time, through use of the novel fanned tip, engaging and retracting a wide portion of tissue (substantially wider than the narrow blade) and simultaneously presenting a wide pattern of evacuation suction (substantially wider than the narrow blade) in the surgical field to remove undesirable fluids.

FIG. 18 illustrates a representation of a side view of a blade 106 in accordance with certain embodiments wherein the blade 106 comprises a perforation spaced approximately 5 cm from the distal end 118 toward the proximal end 116, and having a circular opening of approximately 1 mm in diameter, and positioned at a point along the circumference of the blade 106 that faces toward the surgical field during use of the retractor. This proximal perforation 138 forms a fluid passage between the blade fluid passage 130 and evacuable matter external to the blade at the point of the proximal perforation 138. The proximal perforation 138 is advantageously positioned to avoid contact with tissue or viscous fluids during use such that it remains unblocked even when perforations located closer to the distal end 118 may be blocked, partially blocked, or temporarily blocked such as, for example, due to contact with tissue or evacuable matter. Thus, advantageously, the suction flow remains unblocked relieving any tendency of the blade fluid passage 130 to collapse. Further advantageously, a proximal perforation 138 continues to evacuate dangerous surgical plume, smoke and vaporized matter from the surgical field even when other perforations are blocked, partially blocked and/or temporarily blocked. Still further advantageously, should any fluid passage or perforation become blocked, a syringe may be used at a proximal perforation 138 to introduce and push fluid backwards through the fluid passage to dislodge any blockage. For example, a syringe prefilled with saline may be used for such purpose.

It is contemplated that a proximal perforation 138 could be spaced approximately 3 cm from the distal end 118 or at any point on the blade 106 further away from the distal end 118. It is further contemplated that some embodiments have a proximal perforation 138 with an opening having a greater area, such as, for example, 20 mm$^2$ or even greater, and still other embodiments may have two or more proximal perforations.

FIG. 19 illustrates a representation of a top view of a handle 104 in accordance with one or more embodiments wherein the handle 104 comprises two perforations 138 located at the blade end 110, each having a circular opening of approximately 1 mm in diameter, and positioned at a point along the circumference of the handle 104 that faces the center of the surgical field during use of the retractor. Each of the two perforations 138 forms a fluid passage between the handle fluid passage 120 and evacuable matter external to the handle at the point of the proximal perforations 138.

In embodiments having a handle 104 with at least one depression 114, two perforations 138 advantageously provide for continuous suction flow (and continuing evacuation of undesirable fluids including dangerous surgical plume, smoke and vaporized matter) and avoidance of any tendency for a fluid passage to collapse even if one of the two handle perforations becomes blocked along with all other perforations located on the blade 106.

In some embodiments, a blade fluid passage 130 and a handle fluid passage 120 that each have cross-sectional areas at all points along their length that are greater than the greatest area of any perforation opening 138, 142 may be included. This arrangement advantageously reduces the possibility of a blockage forming from any evacuable matter suctioned through a perforation and into any of the fluid passages in the retractor 102.

In some embodiments the handle 104, the blade 106 and the suction port 112 are formed or molded together in a single finished retractor 102. In other embodiments, each of the handle 104, the blade 106 and the suction port 112 may be separately formed or molded and subsequently joined using a medical grade, biocompatible adhesive appropriate for the material used. Whether molded as a single unit or in parts to be joined, the outer surfaces along the exterior of the retractor 102 are smooth, with the slight exception of surfaces which include knurling as discussed below. In some embodiments, the retractor 102 is injection molded using medical grade polypropylene or medical grade polycarbonate, either of which is advantageously readily available at relatively low cost, injection moldable, biocompatible, and, when molding is completed, either can provide transparency for visualization, and either is resilient to most sterilization techniques. In some instances, the retractor is a single-use disposable instrument, but it will be appreciated that embodiments of the retractor could be sterilized before use in another procedure. Again, it will be appreciated that the handle 104, the blade 106 and the suction port 112 may be made from any medical grade metal, plastic, glass, ceramic or carbon fiber. In some embodiments, at least a portion of the handle 104 and blade 106 will be formed from a transparent material to permit, from a position outside the retractor 102, visualization and observation of evacuable matter as it passes through the blade fluid passage 130 and the handle fluid passage 120.

Some embodiments of the handle 104 include one or more depressions 114 within which an operator of the retractor 102 may rest a thumb or finger. Each depression 114 is elliptical in shape (from a top down view), is approximately 2.5 cm long by 14 mm wide, and is concave having a depth of approximately 5 mm. It will be appreciated that the depression dimensions may vary somewhat and still comfortably accommodate a thumb tip or finger tip, depending at least in part on a user's anatomy. Some embodiments have a depression 114 located on the top of the handle 104 (visible from a top down view such as illustrated in FIG. 2). Other embodiments have a first depression 114 located on the top of the handle 104, and also have a second depression located circumferentially opposite the first depression and thereby advantageously accommodate both a thumb and a fingertip during use. It is contemplated that in such configuration, the fingertip may rest in the second depression roughly perpendicular to the lengthwise axis of the depression. Some embodiments may have three or four depressions to accommodate alternate grips of the retractor during use. Advantageously, one or more depressions 114 provide comfort in gripping the retractor 102 not found in prior art retractors, which allows an operator to use the retractor for longer periods of time without shifting grips due to discomfort. Further advantageously, one or more depressions provide a more secure grip on the handle 104 using less muscle-based squeezing force, thus reducing hand and arm fatigue, and at the same time reducing slippage. Still further, one or more depressions enhance the operator's ability to pivot the retractor into the surgical field, and also to pull the retractor away from the surgical field to displace tissue during a surgical procedure.

Providing additional advantage of improving grip and reducing slippage of the retractor 102 during use, the handle 104 in some embodiments includes knurling in the form of raised smooth ridges in a particular pattern along the outer surface of the handle 104. As used herein, knurling refers to the forming of one or more ridges on an object's outer surface for the purpose of improving the ease with which such an object can be physically handled or gripped and for the purpose of reducing slippage of the object from such grip, and wherein such ridges can be straight ridges and/or curved ridges.

Figure 20:
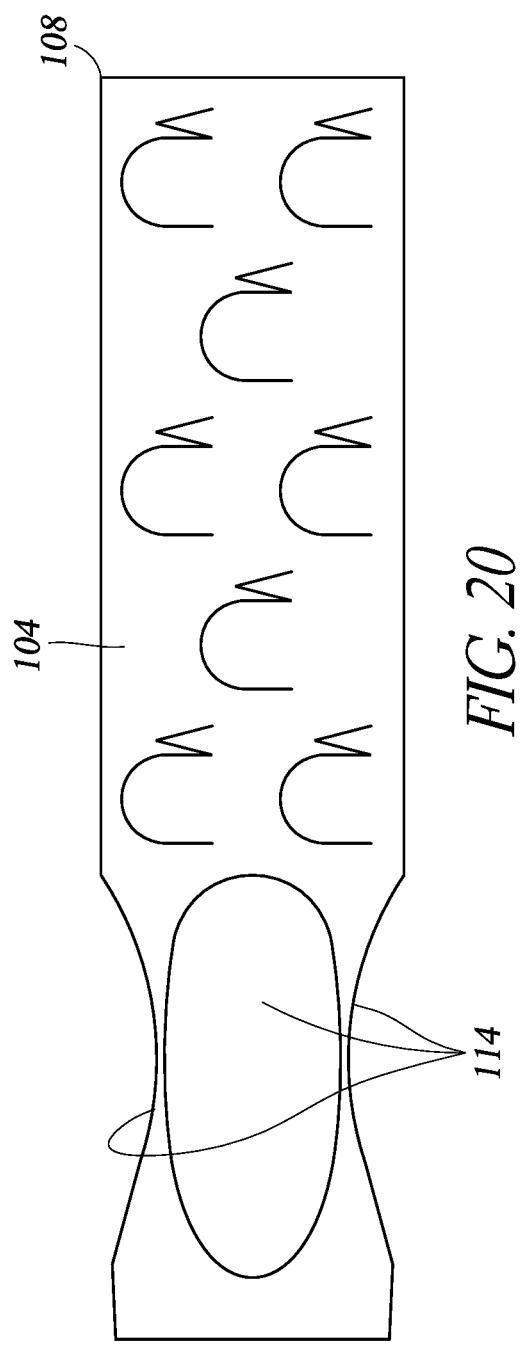
FIG. 20 illustrates a representation of a top down view of the handle with instances of a knurling pattern in accordance with one or more embodiments.
Figure 21:
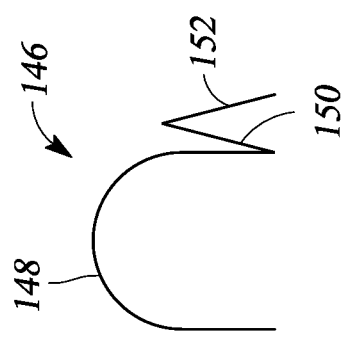
FIG. 21 illustrates a representation of a knurling pattern in accordance with one or more embodiments.

FIG. 20 illustrates a representation of a top down view of the handle 104 with a plurality of instances of a knurling pattern 146 formed on the outer surface of the handle 104 in accordance with one or more embodiments. In such embodiments, the handle 104 measures approximately 7 cm along its length from the suction source end 108 to one or more depressions 114. In such embodiments wherein the handle 104 has a cross-sectional shape of a square with rounded corners, the width of such cross-section is in the range of approximately 16 mm to 25 mm, but could be more or less. FIG. 20 illustrates a top view of the handle 104 with a top side having an area approximately 7 cm×16 mm, which top side comprises eight instances of a knurling pattern. FIG. 21 illustrates a representation of a knurling pattern 146.

As illustrated in FIG. 20, the eight instances of the knurling patter 146 are arranged in five columns along the approximately 7 cm length to comprise an alternating arrangement comprising two knurling patterns in a first column, one knurling pattern in a second column, two knurling patterns in a third column, one knurling pattern in a fourth column and two knurling patterns in a fifth column, such that none of the knurling patterns overlaps another and the knurling patterns are centered in their respective columns. In some embodiments of the handle 104, each of the three sides of the handle 104 not illustrated in FIG. 20 comprises the same arrangement of eight instances of a knurling pattern 146.

Turning back to FIG. 21, the knurling pattern 146 advantageously includes a curved ridge 148, a first straight ridge 150 and a second straight ridge 152 that is not parallel to the first straight ridge 150. Each of the curved, first and second straight ridges, 148, 150 and 152, is formed on the outer surface of the handle 104 as an outwardly protruding ridge approximately 1 mm high and 1 mm wide. As such, it will be appreciated that each ridge provides resistance to movement of the handle 104 within the grip of a human hand, and it will be further appreciated that resistance provided by a ridge is maximized when the ridge runs perpendicular to the potential movement vector of the handle 104 within the grip of the human hand.

As illustrated in FIG. 21, the first and second straight ridges 150, 152 in the knurling pattern 146 are advantageously not parallel to each other, but rather at angles such that they meet at a point of intersection and thus maximize slippage resistance at differing movement vectors perpendicular to the first and second straight ridges 150, 152. Moreover, the curved ridge 148 comprises a circular arc of at least 180 degrees and thus, advantageously, provides maximal slippage resistance at all directional vectors, as any directional vector is perpendicular to a certain point along the arc of the curved ridge 148, in the same manner as a normal line through a curve is perpendicular to a tangent line at that point. It is thus contemplated that the knurling pattern 146 improves an operator's grip of the retractor 102 and significantly minimizes instances of the retractor 102 slipping from an operator's grip.

In some embodiments, a handle 104 may include knurling patterns that comprise a plurality of non-parallel straight line ridges. In some instances, a handle 104 may include knurling patterns that comprise a plurality of curved ridges, each of which comprises an arc of at least 180 degrees. In further embodiments, a handle 104 may include at least one knurling pattern that comprises a plurality of non-parallel straight line ridges and also comprises at least one curved ridge comprising an arc of at least 180 degrees.

In certain embodiments, the retractor 102 is approximately 27 cm in length from the suction source end 108 of the handle 104 to the distal end 118 of the blade 106. The handle 104 has a cross-section shaped as a square with rounded corners, with sides measuring approximately 16 mm. The handle 104 comprises a handle fluid passage 120 that has a circular cross-section of uniform, approximately 6 mm diameter along the length of the passage. As illustrated in FIG. 4, the handle 104, at its blade end 110, has a circular cross-section with a diameter of approximately 14 mm. Between the one or more depressions 114 and the blade end 110, the cross-section of the handle 104 gradually changes from that of a square with rounded corners, to a circular cross-section. The blade 106, at its proximal end 116, has a circular cross-section with a diameter of approximately 14 mm and joins to the blade end 110 of the handle 104 to form a smooth and uninterrupted outer surface. The blade 106 is tube-like and gradually narrows from a circular cross-section having an approximately 14 mm diameter at its proximal end 116 to a circular cross-section having an approximately 10 mm diameter at the point along its length where it begins to widen to form the fanned tip 136. The blade 106 comprises a blade fluid passage 130 that has a circular cross-section of uniform, approximately 6 mm diameter along the length of the passage until it is joined with other fluid passages that terminate in side or end perforations in the fanned tip 136. It will be appreciated that the above dimensions may be altered to varying degrees without detracting from the utility.

The retractor 102 may still contribute importantly to a surgical procedure even when it is not needed as a retractor, and even when it is not needed as a retractor only temporarily during the same procedure. For example, and advantageously, its capacity to evacuate plume, smoke and vaporized matter is vitally important even when its retraction capacity is not needed. It is thus contemplated that the retractor 102 may be secured to be near the surgical field even when it is not in use for retraction.

FIG. 22 illustrates a representation of a front view of a retractor clip 154 in accordance with one or more embodiments. As will be detailed, the retractor clip 154 removably secures the retractor 102 to another retractor that is in use during a surgical procedure. In such arrangement, the retractor 102 advantageously evacuates dangerous plume, smoke and vaporized matter from the surgical field even when it is not in use for retraction.

The retractor clip 154 comprises four prongs 156 (two illustrated in front view), each prong having a retractor tab 158 at one end and a blade tab 160 at the other end. The retractor tabs and blade tabs 158, 160 can be made from a medical grade plastic. The prongs 156 can be made from a flexible medical grade plastic such that they can be bent by reasonable manual force without breaking and will spring back to original resting position when released. It will be appreciated that the clip 154, including tabs and prongs, can be made from one or more bendable materials such as medical grade bendable metals, plastic, rubber, and including medical grade silicone. It will further be appreciated that, from such set of medical grade materials, one or more could be selected that is suitable for sterilization, such as through use of autoclave, gamma irradiation and/or dry air sterilization processes.

In some embodiments, the cross-section of each of the prongs 156 has a shape of an approximately 2 mm×2 mm square with rounded corners. The four prongs 156 are held in an arrangement parallel to each other by being fixed to a frame 162. FIG. 23 illustrates a representation of a side view of a retractor clip 154 in accordance with some embodiments. FIG. 24 illustrates a representation of a perspective view of a retractor clip 154 in accordance with some embodiments.

The length of each prong 156, from the frame 162 to the retractor tab 158 is advantageously sized to match the cross-sectional width of the retractor handle 104. Considering the front view of FIG. 22, the distance between the two illustrated prongs 156 also matches the cross-sectional width of the retractor handle 104, as does the distance between the two illustrated prongs in the side view of FIG. 23. Along its two horizontal axes (length and width) as illustrated, the frame 162 is approximately square, with each of the two horizontal axes approximately 4 mm longer than the cross-sectional width of the retractor handle 104. Along its vertical axis (thickness), the frame, in some embodiments, is 4 mm thick. It will be appreciated that the frame thickness may vary somewhat in other embodiments, such as, for example, 2 mm or 3 mm, without departing from its contribution.

The length of each prong 156, from the frame 162 to the blade tab is advantageously sized to match the thickness of a standard retractor blade handle, which, in some embodiments, is two millimeters. Considering again the front view of FIG. 22, the distance between the two illustrated prongs 156 also matches the width of a standard retractor blade handle, which, in the illustrated embodiments, is the same as the cross-sectional width of the retractor handle 104.

FIG. 25 illustrates an enlarged view of a representation of a tab 158, 160, either a retractor tab or a blade tab in accordance with some embodiments. The tab 158, 160 includes a rounded body 164 and a flat grip face 166. The rounded body 164 includes no sharp or angular edges, and thus advantageously reduces undesirable contact with body tissues in or near a surgical field, such as, for example, snagging, tearing or poking. In the case of a retractor tab 158, the flat grip face 166 advantageously grips an edge and/or side of the retractor 102, and in the case of a blade tab 160, the flat grip face 166 of the tab grips an edge and/or side of a blade or handle of another retractor.

In one use, the retractor clip 154 secures the retractor 102, when not retracting tissue, to another retractor that is retracting tissue. In such use, the retractor 102 may advantageously evacuate plume, smoke, and vaporized matter, as well undesirable fluids, from the surgical field even while not being used as a retractor, and the retractor clip 154 secures the retractor 102 to eliminate the need for an operator to hold the retractor 102 in place for evacuation purposes.

Figure 27:
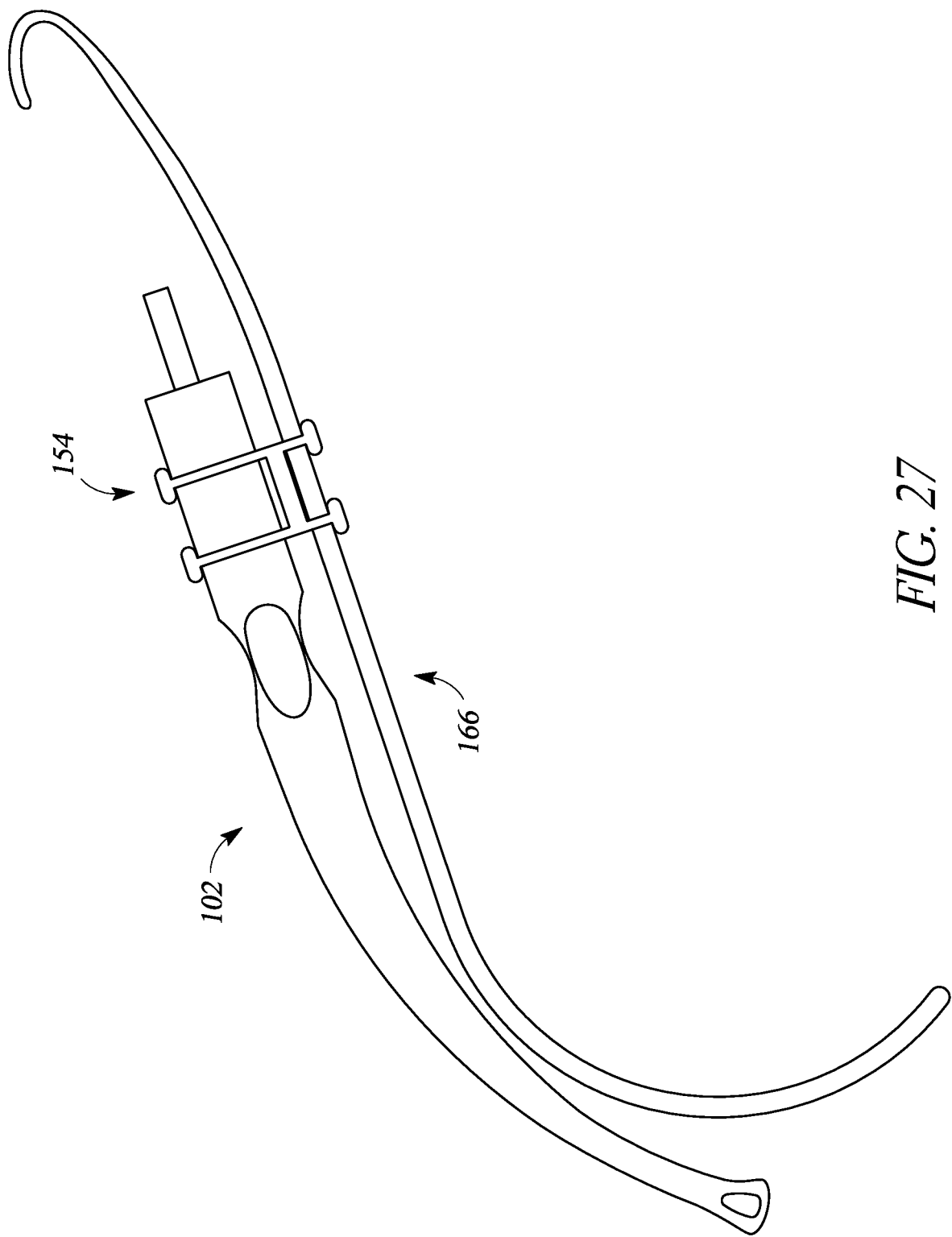
FIG. 27 illustrates a representation of a retractor secured by a retractor clip, in accordance with one or more embodiments, to an exemplary Deaver retractor.

FIG. 27 illustrates a representation of the retractor 102 secured by a retractor clip 154 to a Deaver retractor 168. It will be appreciated that, in accordance with the arrangement illustrated in FIG. 25, the Deaver retractor 168 may be in use retracting tissue, while the retractor 102 is not retracting tissue, but nevertheless continues to advantageously evacuate plume, smoke, and vaporized matter, as well undesirable fluids, from the surgical field. During such use, and though not illustrated in FIG. 25, suction is applied to the retractor 102 via the suction port 112, which is connected to a source of suction. The retractor clip 154 advantageously allows a user to adjust the position of the retractor handle 104 in relation to a lengthwise position along the blade or handle of a secondary retractor (e.g., a Deaver retractor as illustrated in FIG. 27) to achieve a desired position of the retractor 102 in relation to the secondary retractor.

Use of the retractor clip 154 is straightforward. To apply the retractor clip 154 to a retractor being used in a surgical field, a user spreads the prongs 156 at the blade tabs 160 to position the frame 162 against the exposed surface of the retractor handle or blade, and then releases the prongs such that the blade tabs 160 grip the underside of the retractor handle or blade. Next, to secure the retractor 102 to the retractor clip 154, a user spreads the prongs 156 at the retractor tabs, to position the underside of the retractor handle 104 against the frame 162 of the retractor clip 154, and then releases the prongs 156 so that the retractor tabs 158 grip the top side of the retractor 102. The retractor 102 is thus secured to the secondary retractor, and the retractor 102 may advantageously operate to evacuate dangerous plume, smoke and vaporized matter from the surgical field with no need for an operator to hold the retractor 102 in position during such evacuation.

It will be appreciated that secondary retractors may differ in terms of blade width and handle width and that such differences can affect how the retractor 102 may be secured to a secondary retractor. FIG. 26 illustrates a representation of a front view of alternate embodiments of a retractor clip 168, wherein, in the front view dimension, the segments of the prongs 156 between the frame 162 and the blade tabs 160 are spaced further from each other than the segments of the prongs 156 between the frame 162 and the retractor tabs 158. To accommodate the further spacing, the frame 162 on the alternate retractor clip 168 is wider in the front view dimension. The greater spacing between the prong segments in this dimension, and the wider frame in this dimension, permit the retractor 102 to be secured to a secondary retractor having a blade or handle of greater width than the cross-sectional width of the retractor handle 104. Advantageously, the wider frame 162 comprises rounded corners 170, which are free of sharp or angular edges to reduce undesirable contact with body tissues. It will be appreciated that, in the same manner as the segments of the prongs 156 between the frame 162 and the blade tabs 160 are spaced further apart in the embodiments of FIG. 26, they could also be spaced closer together than the segments of the prongs 156 between the frame 162 and the retractor tabs 158, and thus accommodate securement of the retractor 102 to a secondary retractor having a blade or handle of narrower width than the cross-section width of the retractor handle 104.

In additional embodiments (not illustrated), the retractor clip 154 is formed from a soft, bendable medical grade metal. As such, the prongs 156 may be bent apart with reasonable manual force to receive the retractor handle 104 or the handle or blade of a secondary retractor, and then bent together again to secure the retractor handle 104 and/or the handle or blade of a secondary retractor. To release the retractor 102 or the secondary retractor from the clip 154, the prongs 156 may be bent apart reasonable manual force to remove the retractor 102 or the secondary retractor from the clip 154.

While a number of embodiments and variations thereof have been described in detail, other modifications and methods of using and medical applications for the same will be apparent to those of skill in the art. Accordingly, it should be understood that various applications, modifications, and substitutions may be made of equivalents without departing from the spirit of the disclosure or the scope of the claims.

What is claimed is:

1. A retractor, comprising:
    a handle, comprising:
        a suction source end;
        a blade end;
        a handle fluid passage formed within said handle, said handle fluid passage having a first opening closer to said suction source end than to said blade end, and having a second opening closer to said blade end than to said suction source end; and
        a suction port closer to said suction source end than to said blade end, said suction port configured to connect to a suction source during a medical procedure and to direct suction to said first opening of said handle fluid passage, said handle fluid passage configured to direct suction from said first opening to said second opening; and
    a blade comprising:
        a proximal end connected to said blade end of said handle;
        a distal end configured to engage and retract tissue during said medical procedure;
        a blade fluid passage formed within said blade, said blade fluid passage having a proximal opening closer to said proximal end than to said distal end, said proximal opening joined to said second opening of said handle fluid passage such that said handle fluid passage and said blade fluid passage form a continuous fluid passage;
a first perforation formed in said blade; and
a first perforation fluid passage extending from said first perforation to said blade fluid passage, said blade fluid passage configured to direct suction to said first perforation fluid passage, said first perforation fluid passage configured to direct suction to evacuable matter external to said blade during said medical procedure, said first perforation configured to permit passage of said evacuable matter into said first perforation fluid passage for suction evacuation through said blade fluid passage and through said handle fluid passage and through said suction port;
wherein a first blade width of said blade at a first point along its length differs from a second blade width of said blade at a second point along its length; and
wherein a width of said first perforation is greater than said first blade width, and wherein a distance between said first point and said proximal end of said blade is smaller than the distance between said first perforation and said proximal end of said blade.

2. The retractor of claim 1, wherein said handle is composed at least in part of a transparent material permitting visual observation of said evacuable matter in said handle fluid passage.

3. The retractor of claim 1, wherein said blade is composed at least in part of a transparent material permitting visual observation of said evacuable matter in said blade fluid passage.

4. The retractor of claim 1, wherein said blade has a curved shape between said proximal end and said distal end such that, when said handle is held in a position above a surgical field and approximately perpendicular to a central axis of a surgical corridor of said surgical field, said curve of said blade is in a direction downward and toward the surgical field.

5. The retractor of claim 1, wherein said first perforation is an end perforation formed in a distal tip of said blade.

6. The retractor of claim 5, wherein said handle includes at least one depression in an outer surface of said handle in which a portion of a thumb or a portion of a finger may be positioned during use of said retractor.

7. The retractor of claim 5, wherein said handle includes knurling ridges formed in an outer surface of said handle, and wherein said knurling ridges include at least one straight knurling ridge and at least one curved knurling ridge.

8. The retractor of claim 1, further comprising:
a second perforation formed in said blade; and
a second perforation fluid passage extending from said second perforation to said blade fluid passage, said blade fluid passage configured to direct suction to said second perforation fluid passage, said second perforation fluid passage configured to direct suction to evacuable matter external to said blade during said medical procedure, said second perforation configured to permit passage of said evacuable matter into said second perforation fluid passage for suction evacuation through said blade fluid passage and through said handle fluid passage and through said suction port.

9. The retractor of claim 8, wherein a distance between said first perforation and said second perforation is greater than a length of any straight line connecting any two points along a circumference of a cross-section of said blade at a first point along its length, and wherein said first point is closer to said proximal end of said blade than either of said first or second perforations.

10. The retractor of claim 9, wherein a blade width of said blade at said distal end is greater than the blade width of said blade at said first point, and wherein said first and second perforations are end perforations formed in a distal tip of said blade.

11. The retractor of claim 10, wherein the distance between said first perforation and said second perforation is greater than the distance between any two points along the circumference of any cross-section of said blade at any point along at least fifty percent of the length of said blade between said distal end and said proximal end.

12. The retractor of claim 11, wherein said retractor is composed at least in part of a transparent material permitting visual observation of evacuable matter in said blade fluid passage.

13. The retractor of claim 11, further comprising:
a first side perforation formed in said blade between said distal end and said proximal end; and
a first side perforation fluid passage extending from said first side perforation to said blade fluid passage, said blade fluid passage configured to direct suction to said first side perforation fluid passage, said first side perforation fluid passage configured to direct suction to evacuable matter external to said blade during said medical procedure, said first side perforation configured to permit passage of said evacuable matter into said first side perforation fluid passage for suction evacuation through said blade fluid passage and through said handle fluid passage and through said suction port.

14. The retractor of claim 13, further comprising:
a second side perforation formed in said blade between said distal end and said proximal end, wherein the distance between said second side perforation and said proximal end is smaller than the distance between said first side perforation and said proximal end; and
a second side perforation fluid passage extending from said second side perforation to said blade fluid passage, said blade fluid passage configured to direct suction to said second side perforation fluid passage, said second side perforation fluid passage configured to direct suction to evacuable matter external to said blade during said medical procedure, said second side perforation configured to permit passage of said evacuable matter into said second side perforation fluid passage for suction evacuation through said blade fluid passage and through said handle fluid passage and through said suction port.

15. The retractor of claim 10, wherein the distance between said first perforation and said second perforation is more than twice the distance between any two points along the circumference of any cross-section of said blade at any point along at least fifty percent of the length of said blade between said distal end and said proximal end.

16. The retractor of claim 15, wherein said retractor is composed at least in part of a transparent material permitting visual observation of evacuable matter in said blade fluid passage.

17. The retractor of claim 15, further comprising:
a first side perforation formed in said blade between said distal end and said proximal end; and
a first side perforation fluid passage extending from said first side perforation to said blade fluid passage, said blade fluid passage configured to direct suction to said first side perforation fluid passage, said first side perforation fluid passage configured to direct suction to evacuable matter external to said blade during said medical procedure, said first side perforation configured to permit passage of said evacuable matter into said first side perforation fluid passage for suction evacuation through said blade fluid passage and through said handle fluid passage and through said suction port.

18. The retractor of claim 17, further comprising:
a second side perforation formed in said blade between said distal end and said proximal end, wherein the distance between said second side perforation and said proximal end is smaller than the distance between said first side perforation and said proximal end; and
a second side perforation fluid passage extending from said second side perforation to said blade fluid passage, said blade fluid passage configured to direct suction to said second side perforation fluid passage, said second side perforation fluid passage configured to direct suction to evacuable matter external to said blade during said medical procedure, said second side perforation configured to permit passage of said evacuable matter into said second side perforation fluid passage for suction evacuation through said blade fluid passage and through said handle fluid passage and through said suction port.

19. The retractor of claim 18, wherein said handle includes at least one depression in an outer surface of said handle in which a portion of a thumb or a portion of a finger may be positioned during use of said retractor.

20. The retractor of claim 18, wherein said handle includes knurling ridges formed in an outer surface of said handle, and wherein said knurling ridges include at least one straight knurling ridge and at least one curved knurling ridge.

21. The retractor of claim 15, further comprising:
a handle perforation formed in said handle between said blade end and said suction source end; and
a handle perforation fluid passage extending from said handle perforation to said handle fluid passage, said handle fluid passage configured to direct suction to said handle perforation fluid passage, said handle perforation fluid passage configured to direct suction to evacuable matter external to said handle during said medical procedure, said handle perforation configured to permit passage of said evacuable matter into said handle perforation fluid passage for suction evacuation through said handle fluid passage and through said suction port.

22. The retractor of claim 10, wherein the distance between said first perforation and said second perforation is more than three times the distance between any two points along the circumference of any cross-section of said blade at any point along at least fifty percent of the length of said blade between said distal end and said proximal end.

23. The retractor of claim 22, further comprising:
a first side perforation formed in said blade between said distal end and said proximal end; and
a first side perforation fluid passage extending from said first side perforation to said blade fluid passage, said blade fluid passage configured to direct suction to said first side perforation fluid passage, said first side perforation fluid passage configured to direct suction to evacuable matter external to said blade during said medical procedure, said first side perforation configured to permit passage of said evacuable matter into said first side perforation fluid passage for suction evacuation through said blade fluid passage and through said handle fluid passage and through said suction port.

24. The retractor of claim 23, further comprising:
a second side perforation formed in said blade between said distal end and said proximal end, wherein the distance between said second side perforation and said proximal end is smaller than the distance between said first side perforation and said proximal end; and
a second side perforation fluid passage extending from said second side perforation to said blade fluid passage, said blade fluid passage configured to direct suction to said second side perforation fluid passage, said second side perforation fluid passage configured to direct suction to evacuable matter external to said blade during said medical procedure, said second side perforation configured to permit passage of said evacuable matter into said second side perforation fluid passage for suction evacuation through said blade fluid passage and through said handle fluid passage and through said suction port.

25. A suctioning retractor, comprising:
a handle having a suction end and a blade end;
a handle fluid passage inside the handle, the handle fluid passage having a first opening to receive suction and a second opening to direct at least some of the suction received at the first opening;
a suction port connected to the suction end, the suction port configured to connect to a suction source during a medical procedure and to direct suction to the first opening;
a blade having a proximal end and a distal end, the proximal end connected to the blade end of the handle and the distal end configured to engage and retract tissue during the medical procedure;
a blade fluid passage inside the blade, the blade fluid passage having a proximal opening joined to the second opening to receive suction directed by the second opening;
a first perforation formed in an outer surface of the blade;
a first perforation fluid passage extending from the first perforation to the blade fluid passage, the blade fluid passage configured to direct suction to the first perforation fluid passage, the first perforation fluid passage configured to direct suction to evacuable matter external to the blade during the medical procedure, the first perforation configured to permit passage of the evacuable matter into the first perforation fluid passage for suction evacuation through the blade fluid passage and through the handle fluid passage and through the suction port; and
a first depression formed in an outer surface of the handle, the depression configured to receive a portion of a thumb or a finger positioned therein during the medical procedure;
wherein the first perforation defines a first perforation opening on the outer surface of the blade such that a distance between two different points along a perimeter of the opening is greater than the distance between any two points along a circumference of any cross-section of the blade at any point along at least fifty percent of a length of the blade between its proximal and distal ends.

26. The suctioning retractor of claim 25, wherein the handle includes knurling ridges formed in an outer surface of the handle, the knurling ridges configured to engage a portion of a hand.

27. The suctioning retractor of claim 25, wherein the blade is curved along its length between the proximal and distal ends such that, when an axis of the length of the handle is positioned perpendicular to a surgical corridor, the distal end of the blade curves downward toward a surgical field corresponding to the surgical corridor.

28. The suctioning retractor of claim 25, wherein the first perforation defines a first perforation opening on the outer surface of the blade such that a distance between two different points along a perimeter of the opening is greater than the distance between any two points along a circumference of any cross-section of the blade at least one point along a length of the blade between its proximal and distal ends.

29. The suctioning retractor of claim 25, wherein the first perforation defines a first perforation opening on the outer surface of the blade such that a distance between two different points along a perimeter of the opening is more than twice the distance between any two points along a circumference of any cross-section of the blade at any point along at least fifty percent of a length of the blade between its proximal and distal ends.

30. The suctioning retractor of claim 25, further comprising:
a second perforation formed in an outer surface of the blade; and
a second perforation fluid passage extending from the second perforation to the blade fluid passage, the blade fluid passage configured to direct suction to the second perforation fluid passage, the second perforation fluid passage configured to direct suction to evacuable matter external to the blade during the medical procedure, the second perforation configured to permit passage of the evacuable matter into the second perforation fluid passage for suction evacuation through the blade fluid passage and through the handle fluid passage and through the suction port.

31. The suctioning retractor of claim 30, wherein a distance between the first and second perforations is greater than a distance between any two points along a circumference of any cross-section of the blade at at least one point along a length of the blade between its proximal and distal ends.

32. The suctioning retractor of claim 30, wherein a distance between the first and second perforations is greater than a distance between any two points along a circumference of any cross-section of the blade at any point along at least fifty percent of a length of the blade between its proximal and distal ends.

33. The suctioning retractor of claim 31, wherein the first and second perforations are located within two centimeters of the distal end of the blade.

34. The suctioning retractor of claim 30, wherein a distance between the first and second perforations is more than twice a distance between any two points along a circumference of any cross-section of the blade at at least one point along a length of the blade between its proximal and distal ends.

35. The suctioning retractor of claim 30, wherein a distance between the first and second perforations is more than twice a distance between any two points along a circumference of any cross-section of the blade at any point along at least fifty percent of a length of the blade between its proximal and distal ends.

36. The suctioning retractor of claim 34, wherein the first and second perforations are located within two centimeters of the distal end of the blade.

37. A retractor, comprising:
a handle, comprising:
a suction source end;
a blade end;
a handle fluid passage formed within said handle, said handle fluid passage having a first opening closer to said suction source end than to said blade end, and having a second opening closer to said blade end than to said suction source end; and
a suction port closer to said suction source end than to said blade end, said suction port configured to connect to a suction source during a medical procedure and to direct suction to said first opening of said handle fluid passage, said handle fluid passage configured to direct suction from said first opening to said second opening; and
a blade comprising:
a proximal end connected to said blade end of said handle;
a distal end configured to engage and retract tissue during said medical procedure;
a blade fluid passage formed within said blade, said blade fluid passage having a proximal opening closer to said proximal end than to said distal end, said proximal opening joined to said second opening of said handle fluid passage such that said handle fluid passage and said blade fluid passage form a continuous fluid passage;
a first perforation formed in said blade;
a first perforation fluid passage extending from said first perforation to said blade fluid passage, said blade fluid passage configured to direct suction to said first perforation fluid passage, said first perforation fluid passage configured to direct suction to evacuable matter external to said blade during said medical procedure, said first perforation configured to permit passage of said evacuable matter into said first perforation fluid passage for suction evacuation through said blade fluid passage and through said handle fluid passage and through said suction port; and
a second perforation formed in said blade; and
a second perforation fluid passage extending from said second perforation to said blade fluid passage, said blade fluid passage configured to direct suction to said second perforation fluid passage, said second perforation fluid passage configured to direct suction to evacuable matter external to said blade during said medical procedure, said second perforation configured to permit passage of said evacuable matter into said second perforation fluid passage for suction evacuation through said blade fluid passage and through said handle fluid passage and through said suction port;
wherein a distance between said first perforation and said second perforation is greater than a length of any straight line connecting any two points along a circumference of a cross-section of said blade at a first point along its length, and wherein said first point is closer to said proximal end of said blade than either of said first or second perforations.

* * * * *